United States Patent
Chun et al.

(10) Patent No.: US 10,313,699 B2
(45) Date of Patent: Jun. 4, 2019

(54) METHOD AND APPARATUS FOR PARALLEL VIDEO DECODING BASED ON MULTI-CORE SYSTEM

(71) Applicant: SAMSUNG ELECTRONICS CO., LTD., Suwon-si (KR)

(72) Inventors: Hyung-ju Chun, Hwaseong-si (KR); Chan-sik Park, Hwaseong-si (KR); Ki-won Yoo, Seoul (KR); Jae-moon Kim, Uiwang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 18 days.

(21) Appl. No.: 15/519,620

(22) PCT Filed: Oct. 7, 2015

(86) PCT No.: PCT/KR2015/010620
§ 371 (c)(1),
(2) Date: Apr. 17, 2017

(87) PCT Pub. No.: WO2016/060405
PCT Pub. Date: Apr. 21, 2016

(65) Prior Publication Data
US 2017/0251220 A1  Aug. 31, 2017

(30) Foreign Application Priority Data
Oct. 17, 2014  (KR) .................. 10-2014-0141203

(51) Int. Cl.
*H04N 19/44*  (2014.01)
*H04N 19/105*  (2014.01)
(Continued)

(52) U.S. Cl.
CPC .......... *H04N 19/513* (2014.11); *H04N 19/105* (2014.11); *H04N 19/156* (2014.11);
(Continued)

(58) Field of Classification Search
CPC ................ H04N 19/105; H04N 19/156; H04N 19/172; H04N 19/176; H04N 19/436; H04N 19/44; H04N 19/513
See application file for complete search history.

(56) References Cited

U.S. PATENT DOCUMENTS

| 8,532,196 B2 | 9/2013 | Noda et al. |
| 2008/0159408 A1* | 7/2008 | Degtyarenko ....... H04N 19/159 375/240.25 |

(Continued)

FOREIGN PATENT DOCUMENTS

| EP | 0 910 219 A2 | 4/1999 |
| JP | 2011-66844 A | 3/2011 |

(Continued)

OTHER PUBLICATIONS

Communication issued by the European Patent Office dated Jul. 24, 2017 in counterpart European Patent Application No. 15849972.3.
(Continued)

*Primary Examiner* — Anner N Holder
(74) *Attorney, Agent, or Firm* — Sughrue Mion, PLLC

(57) ABSTRACT

A video decoding method includes obtaining a motion vector of a current block belonging to a first picture from a bitstream, performed by a first decoding unit; determining whether a reference block indicated by the motion vector is decoded, performed by the first decoding unit; and decoding the current block, based on whether the reference block is decoded. The reference block is included in a second picture decoded by a second decoding unit. The first picture and the second picture are decoded in parallel.

8 Claims, 23 Drawing Sheets

(51) Int. Cl.
 *H04N 19/156* (2014.01)
 *H04N 19/172* (2014.01)
 *H04N 19/176* (2014.01)
 *H04N 19/436* (2014.01)
 *H04N 19/513* (2014.01)

(52) U.S. Cl.
 CPC ......... *H04N 19/172* (2014.11); *H04N 19/176* (2014.11); *H04N 19/436* (2014.11); *H04N 19/44* (2014.11)

(56) References Cited

U.S. PATENT DOCUMENTS

| | | |
|---|---|---|
| 2010/0239024 A1 | 9/2010 | Chikamura et al. |
| 2011/0194617 A1 | 8/2011 | Kumar et al. |
| 2012/0121018 A1 | 5/2012 | Kustka et al. |
| 2014/0092970 A1 | 4/2014 | Misra et al. |
| 2014/0355690 A1 | 12/2014 | Choi et al. |
| 2016/0360228 A1* | 12/2016 | Kondo ................. H04N 19/521 |

FOREIGN PATENT DOCUMENTS

| | | |
|---|---|---|
| KR | 10-2008-0050349 A | 6/2008 |
| KR | 10-2013-0086004 A | 7/2013 |
| KR | 10-2014-0082932 A | 7/2014 |
| WO | 2008/020470 A1 | 2/2008 |
| WO | 2008/079041 A1 | 7/2008 |
| WO | 2011/049397 A2 | 4/2011 |

OTHER PUBLICATIONS

Cor Meenderinck et al., "Parallel Scalability of Video Decoders", Journal of Signal Processing Systems, Aug. 12, 2008, pp. 173-194, vol. 57, No. 2, XP019734471, DOI 10.1007/s11265-008-0256-9.

International Search Report dated Feb. 17, 2016 issued by International Searching Authority in counterpart International Application No. PCT/KR2015/010620 (PCT/ISA/210).

Written Opinion dated Feb. 17, 2016 issued by International Searching Authority in counterpart International Application No. PCT/KR2015/010620 (PCT/ISA/237).

Communication dated Nov. 6, 2015 issued by Korean Intellectual Property Office in counterpart Korean Application No. 10-2014-0141203.

Communication dated Mar. 25, 2016 issued by Korean Intellectual Property Office in counterpart Korean Application No. 10-2014-0141203.

Communication dated Aug. 16, 2016 issued by Korean Intellectual Property Office in counterpart Korean Application No. 10-2014-0141203.

Communication dated Oct. 20, 2017, issued by the European Patent Office in counterpart European application No. 15849972.3.

Baker, et al., "Power Reduction via Macroblock Prioritization for Power Aware H.264 Video Applications" Oct. 19, 2008, XP058092427, pp. 261-266.

* cited by examiner

[Fig. 1a]
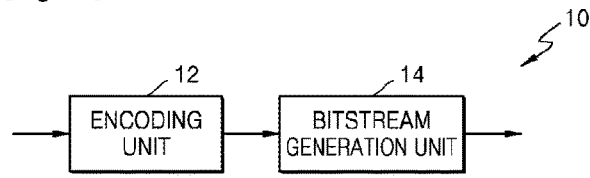
[Fig. 1b]
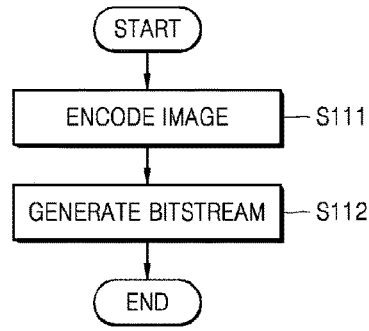
[Fig. 2a]
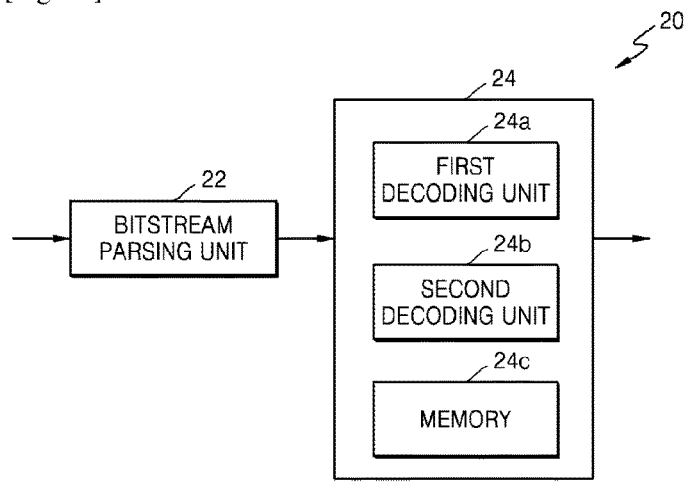
[Fig. 2b]
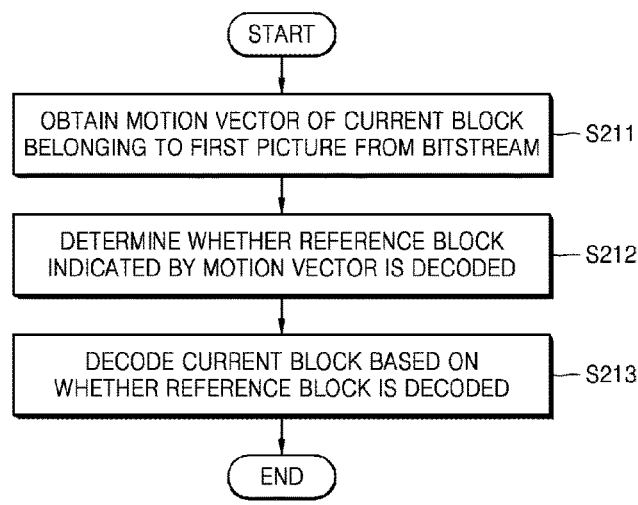

[Fig. 3a]
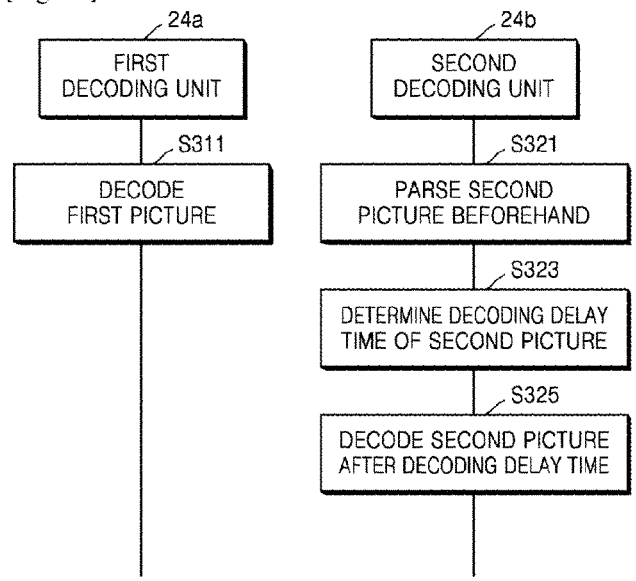
[Fig. 3b]
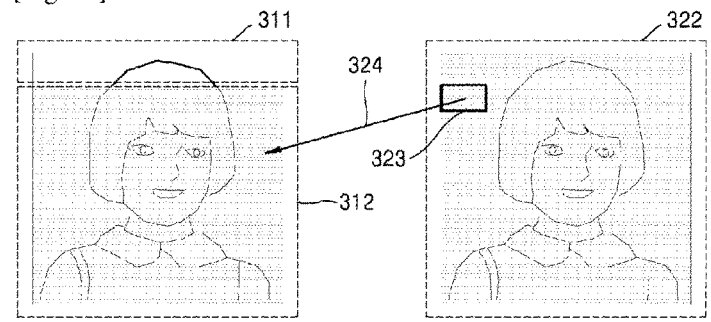
[Fig. 3c]
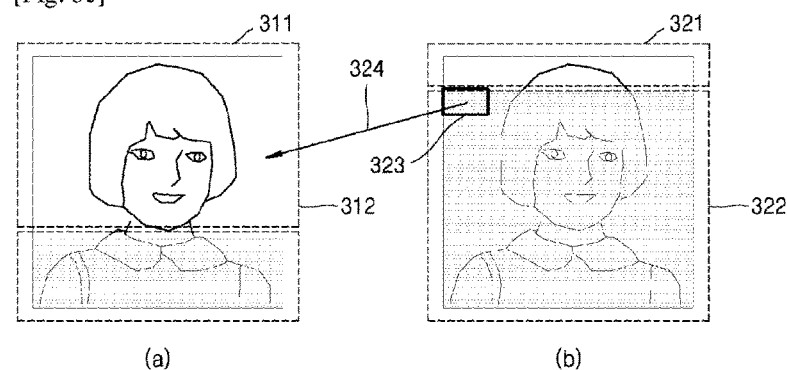

[Fig. 3d]
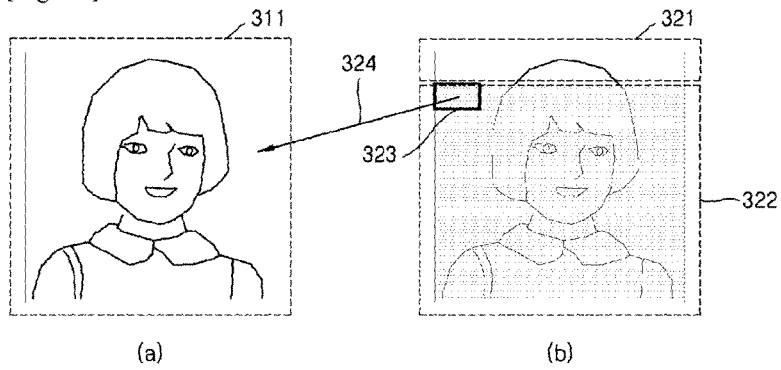
(a)   (b)
[Fig. 4a]
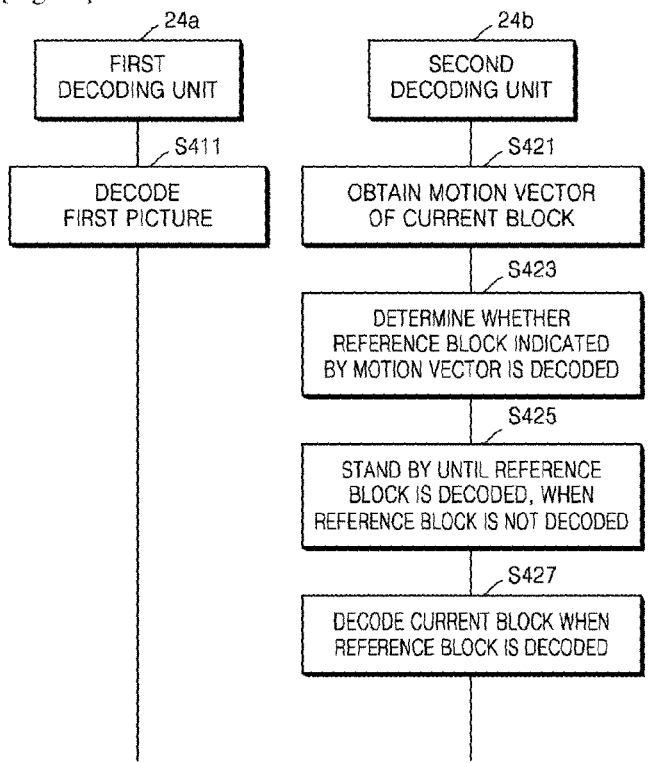
[Fig. 4b]
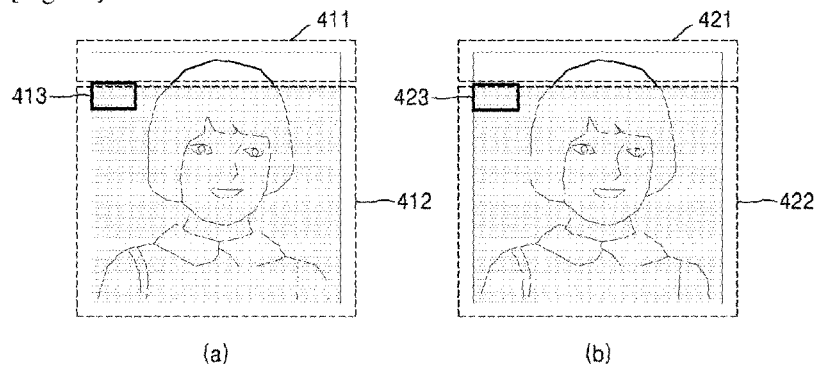
(a)   (b)

[Fig. 4c]
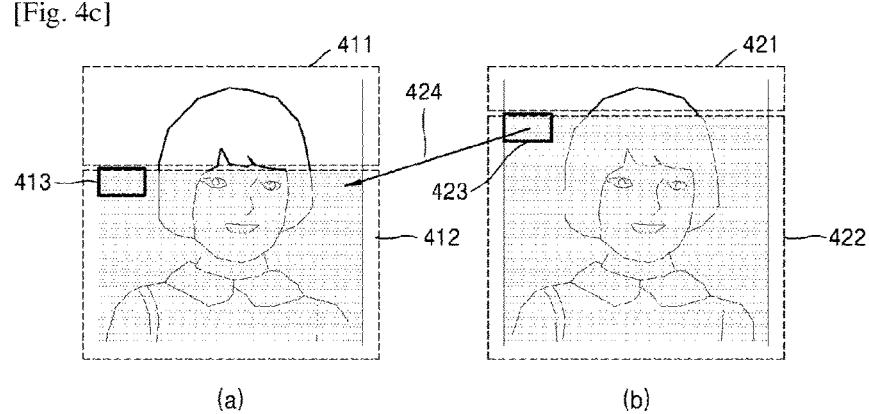
(a)    (b)
[Fig. 4d]
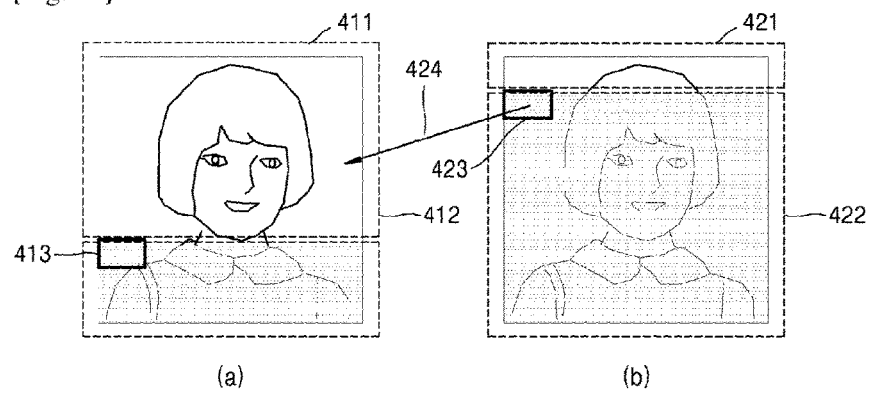
(a)    (b)

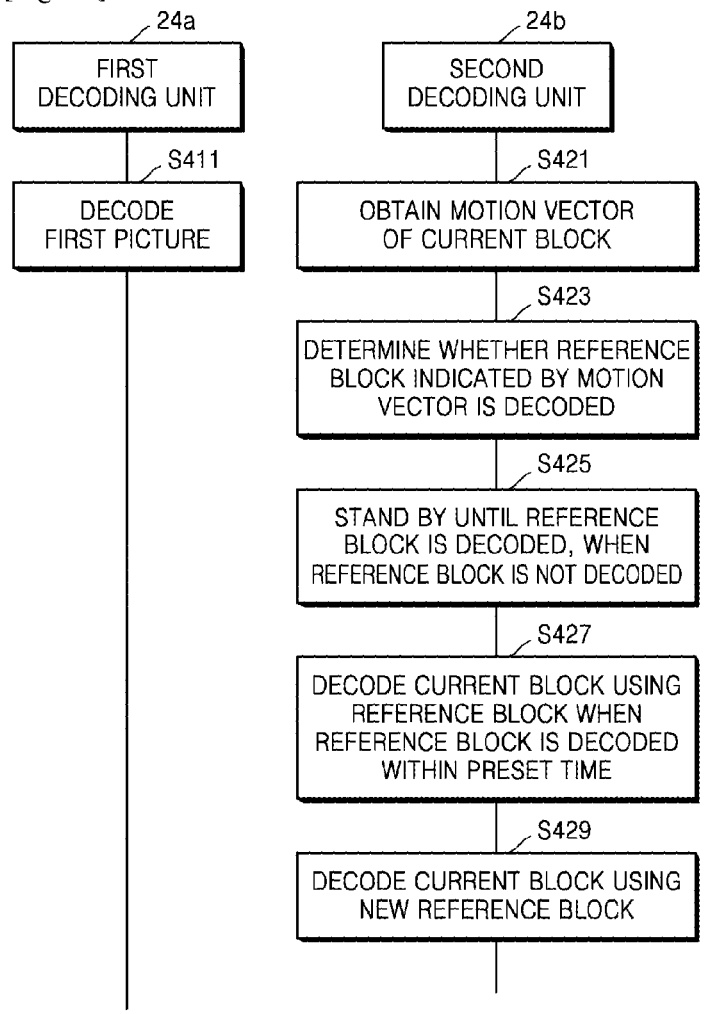

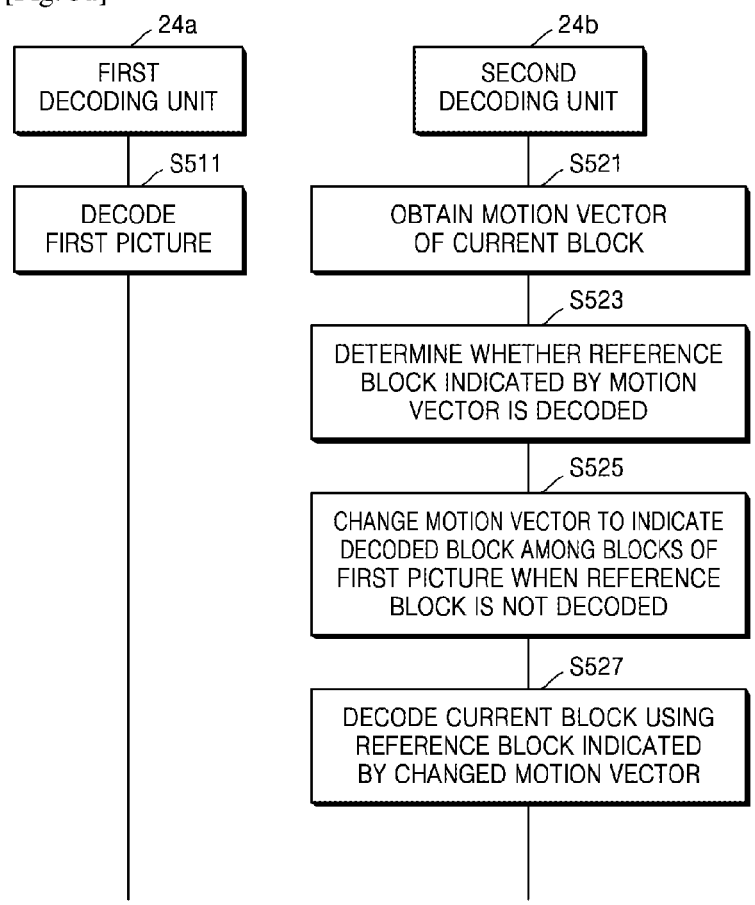

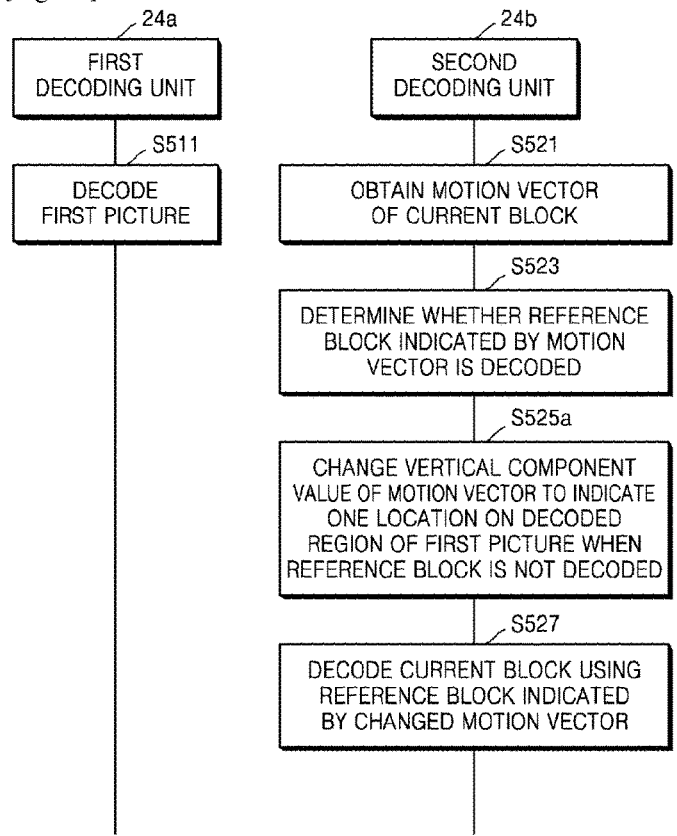
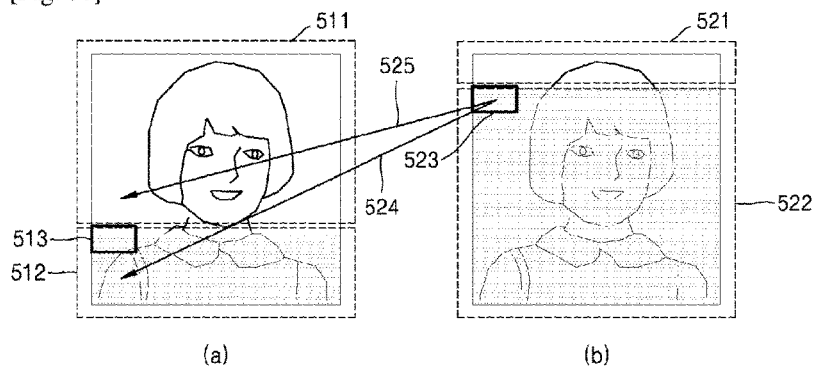

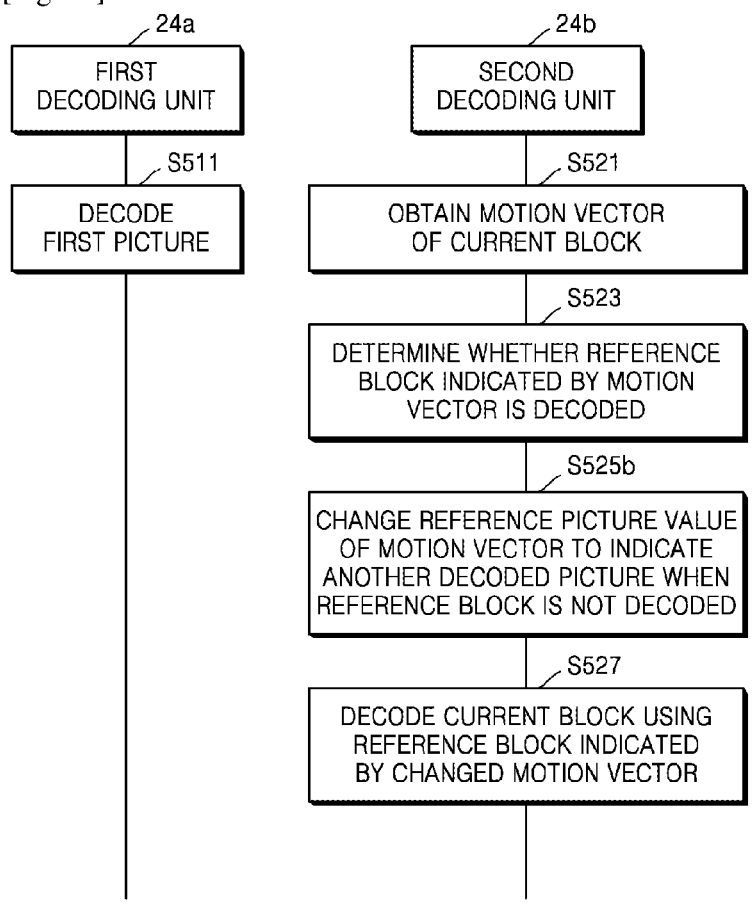
[Fig. 6a]

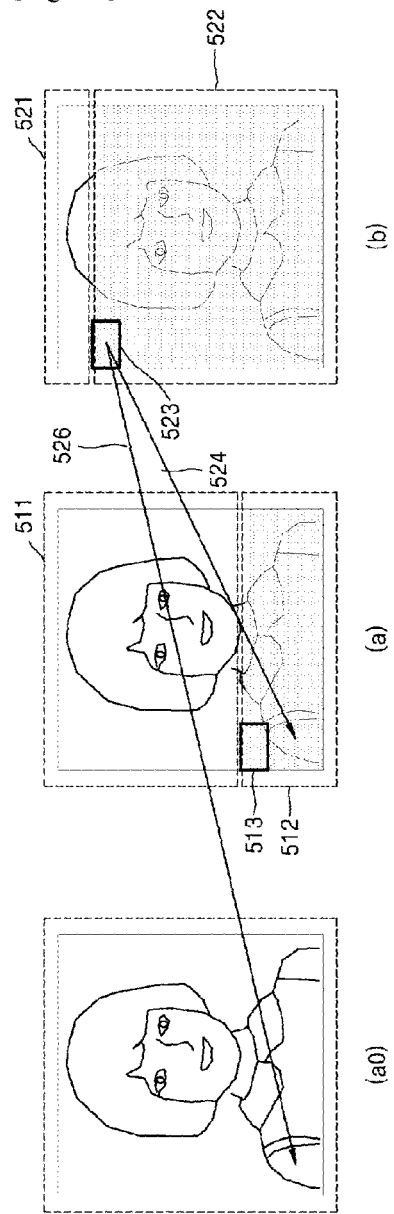
[Fig. 6b]

[Fig. 7a]
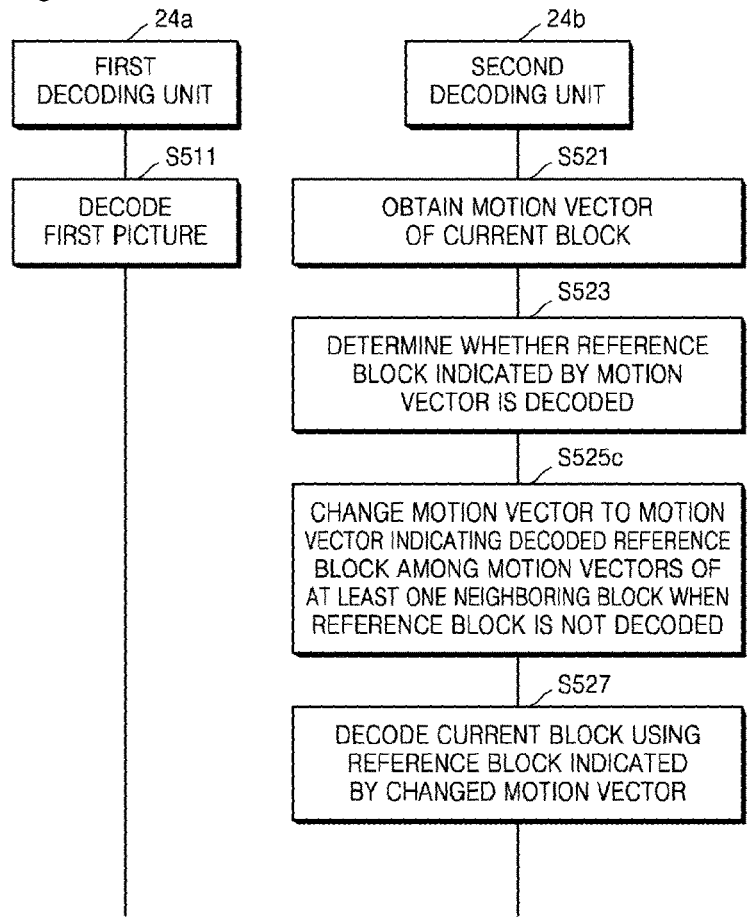
[Fig. 7b]
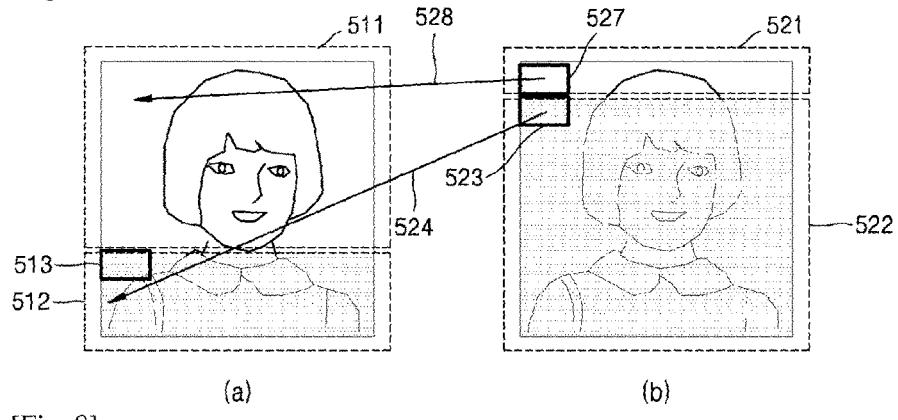
[Fig. 8]
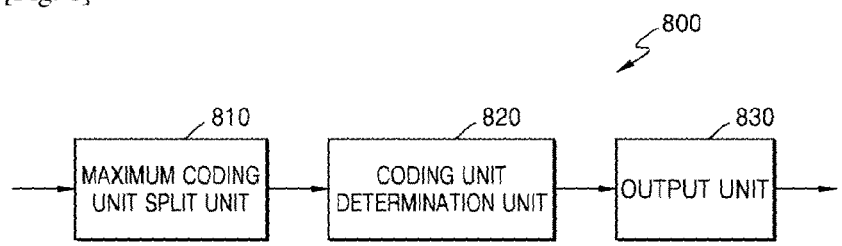

[Fig. 9]
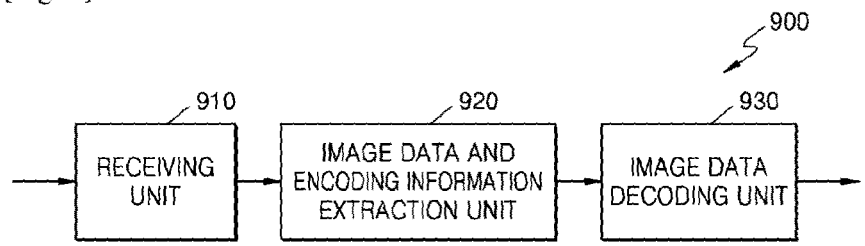
[Fig. 10]
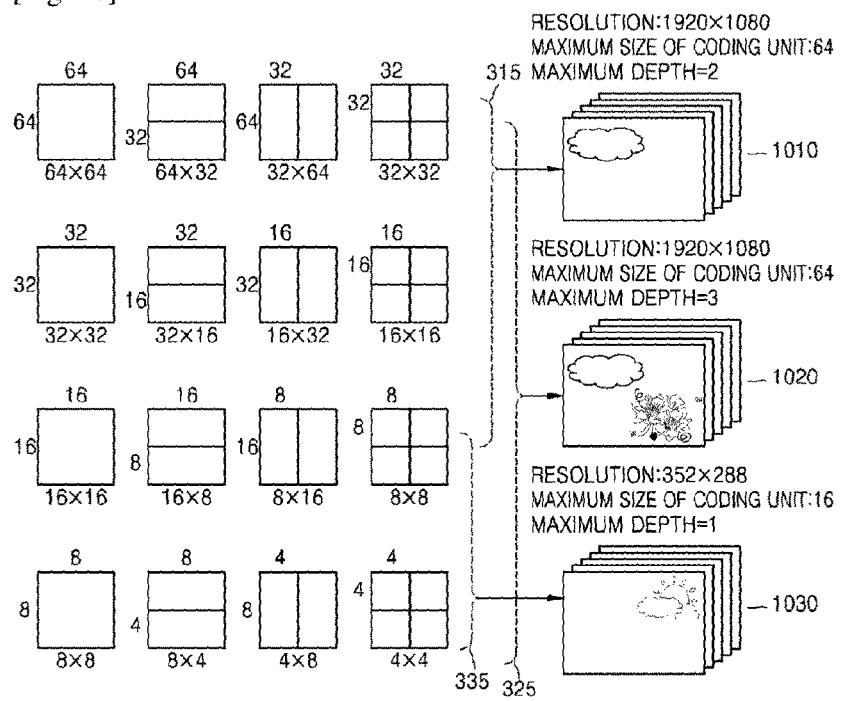

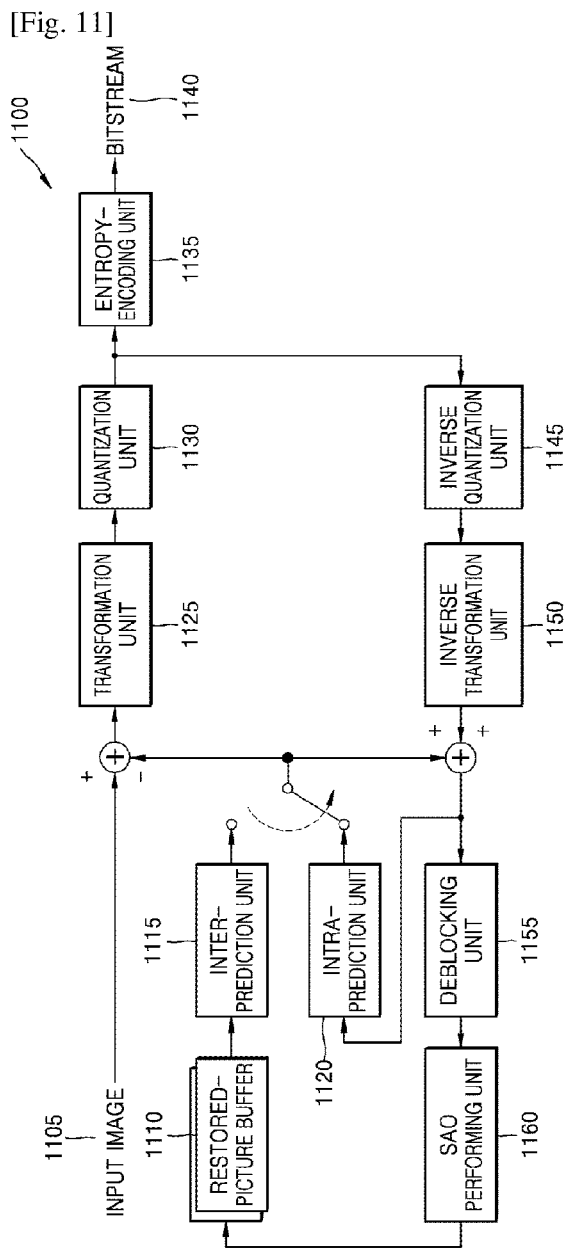
[Fig. 11]

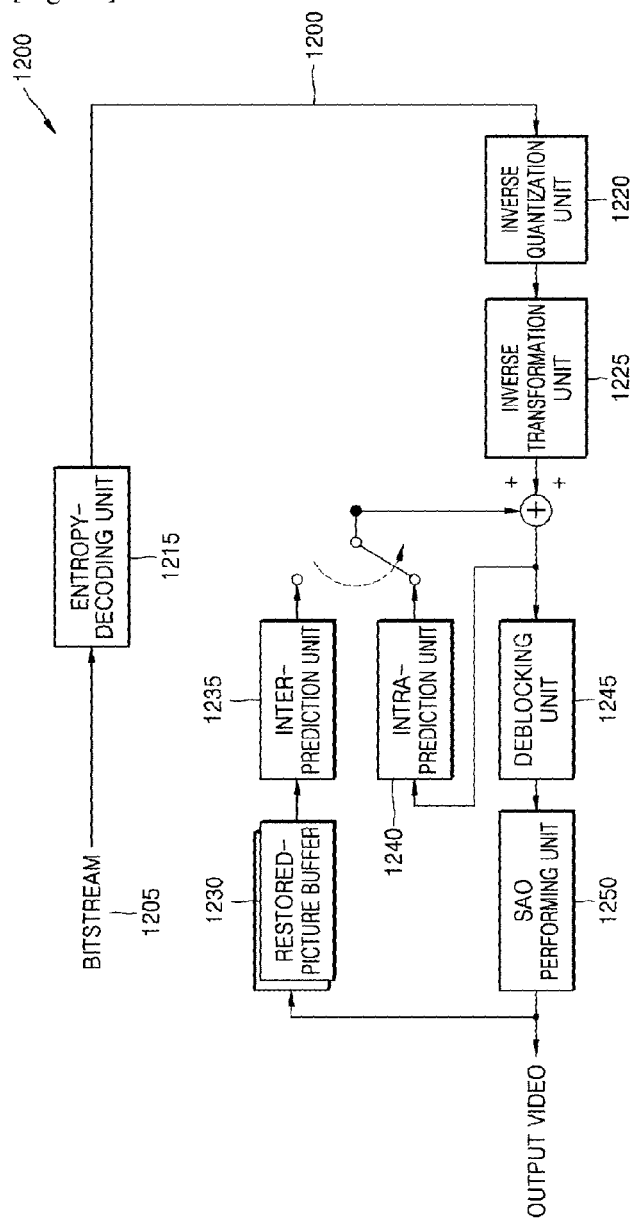
[Fig. 12]

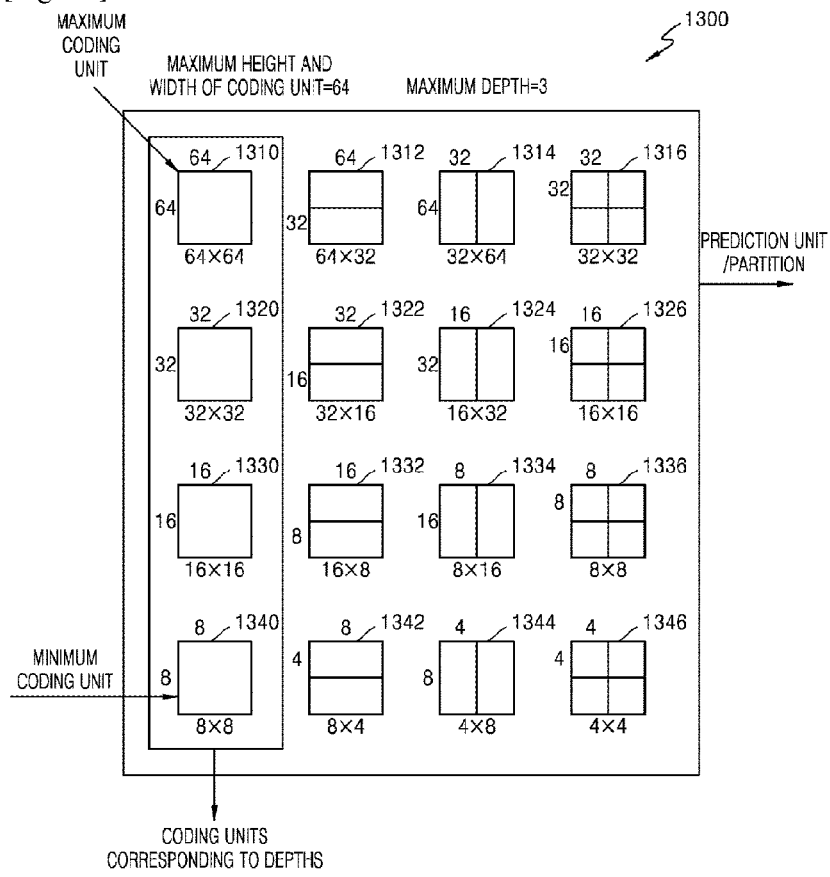
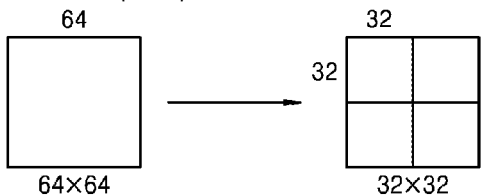

[Fig. 15]
PARTITION MODE (1500)
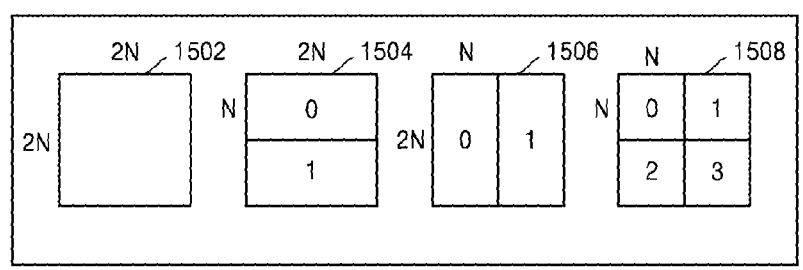
PREDICTION MODE (1510)
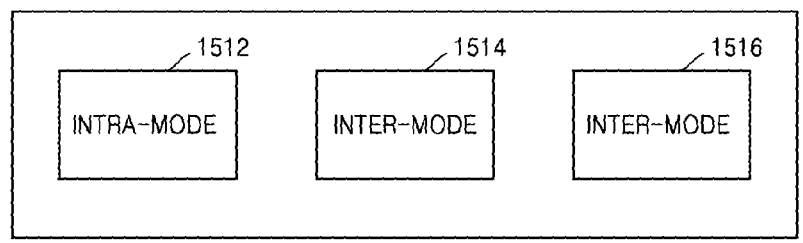
TRANSFORMATION UNIT SIZE (1520)
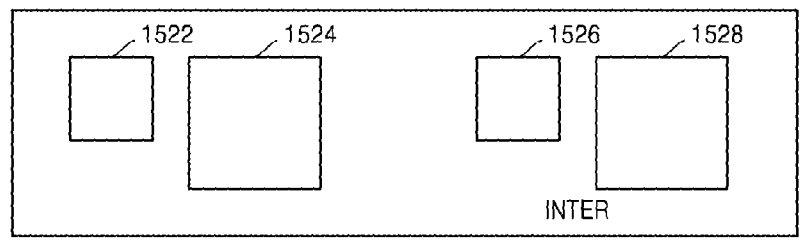

[Fig. 16]
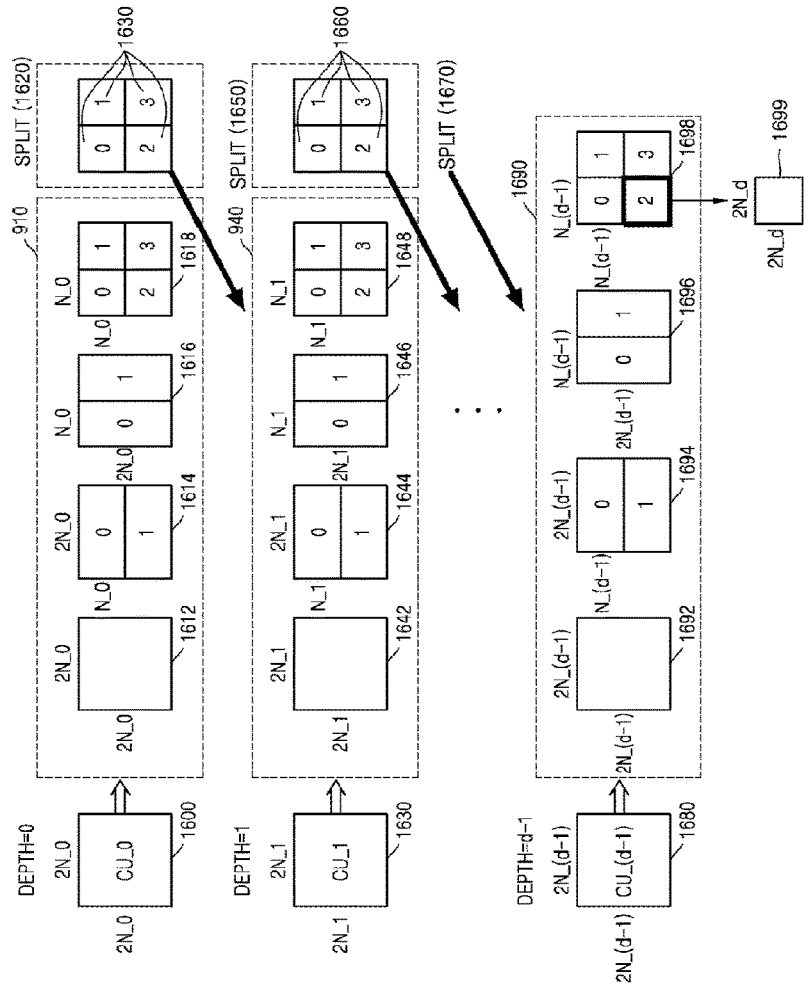
[Fig. 17]
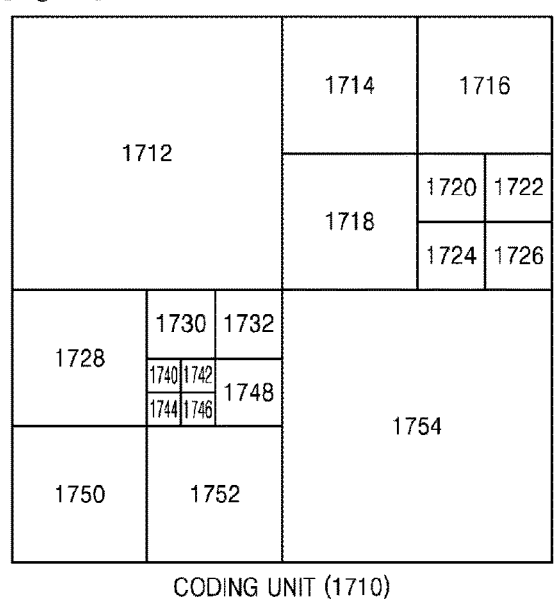
CODING UNIT (1710)

[Fig. 18]
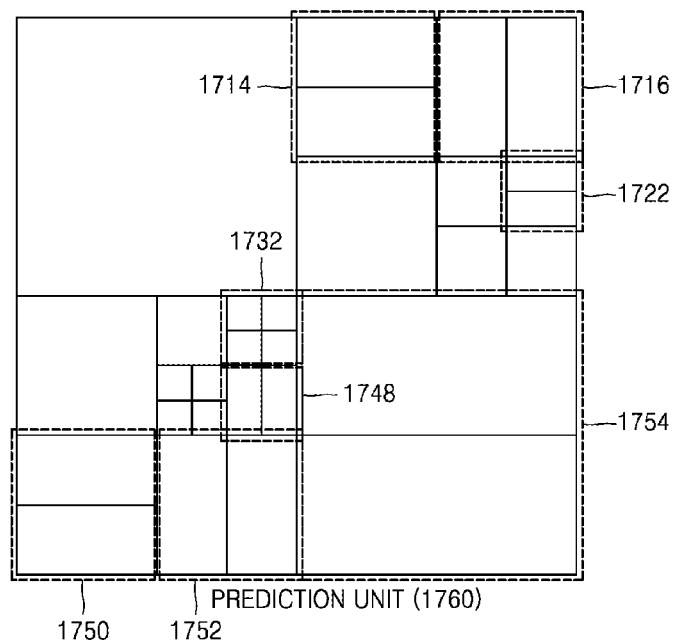
PREDICTION UNIT (1760)
[Fig. 19]
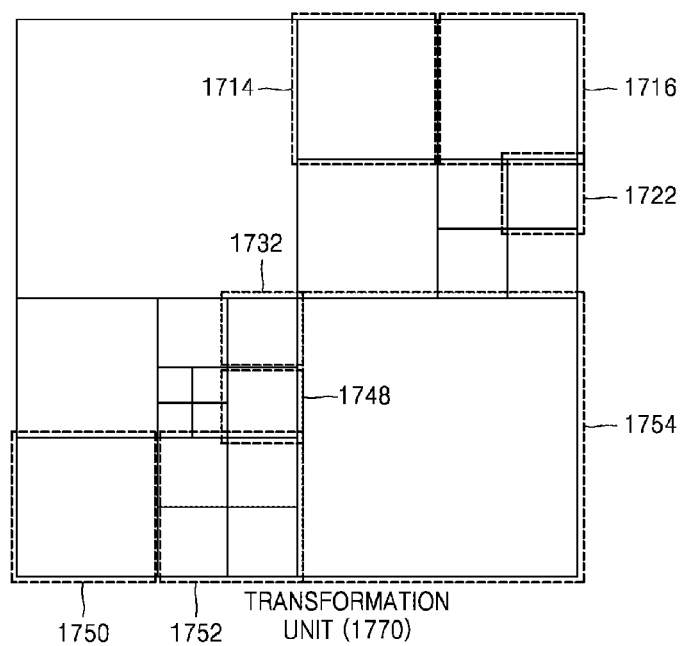
TRANSFORMATION UNIT (1770)

[Fig. 20]
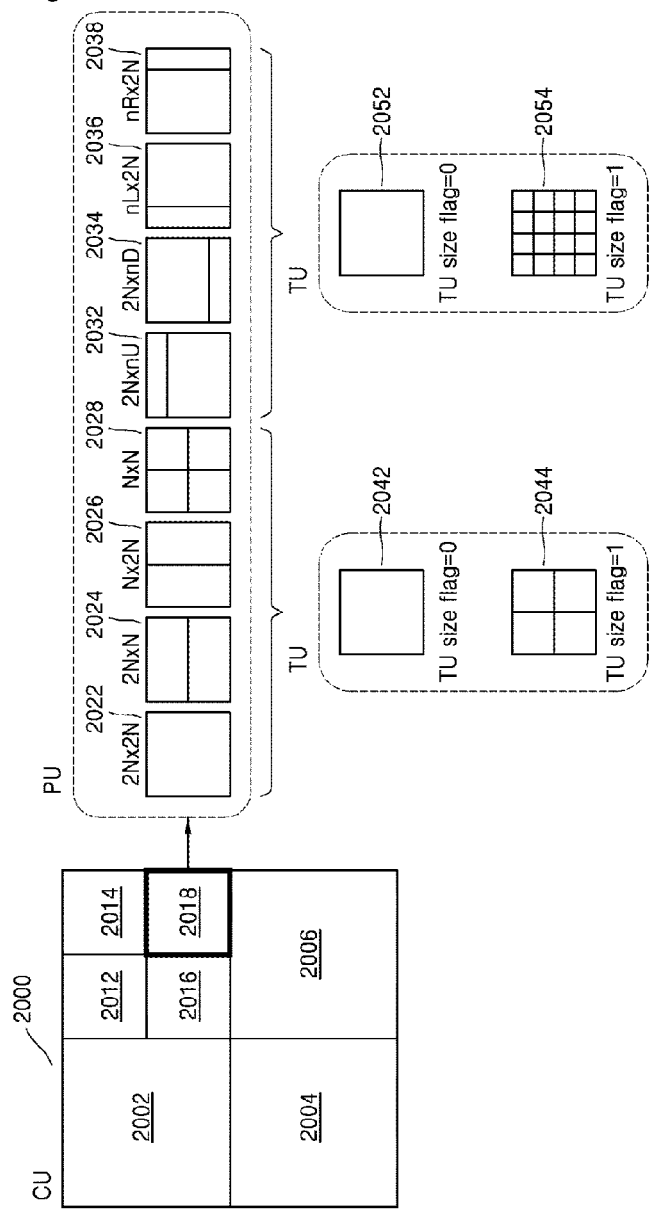
[Fig. 21]
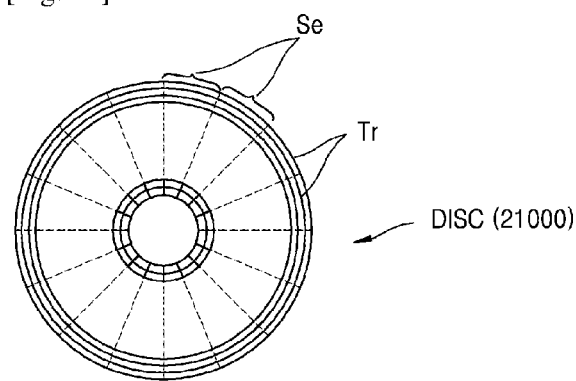

[Fig. 22]
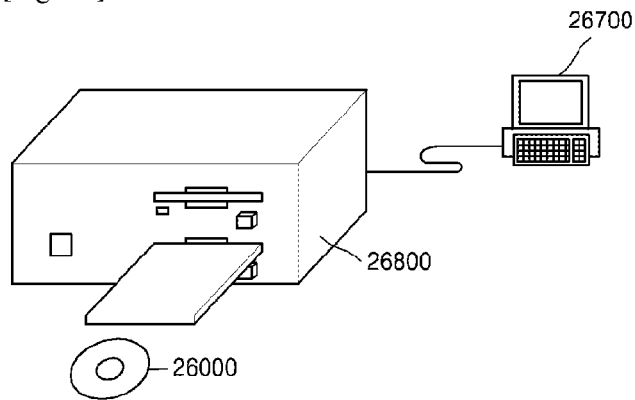
[Fig. 23]
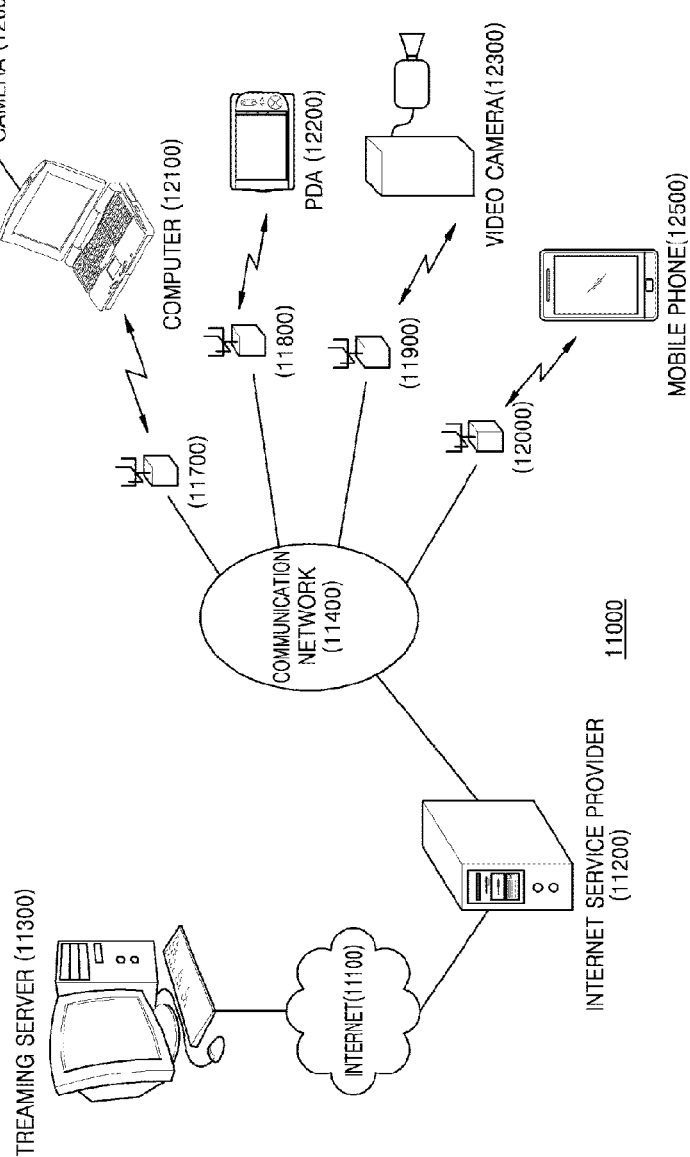

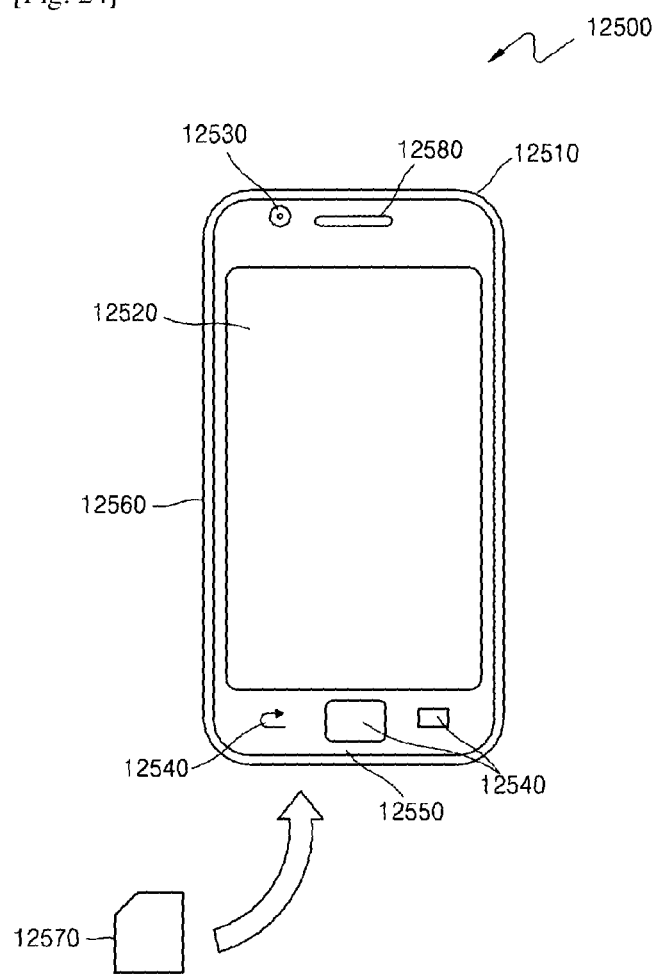
[Fig. 24]

[Fig. 25]
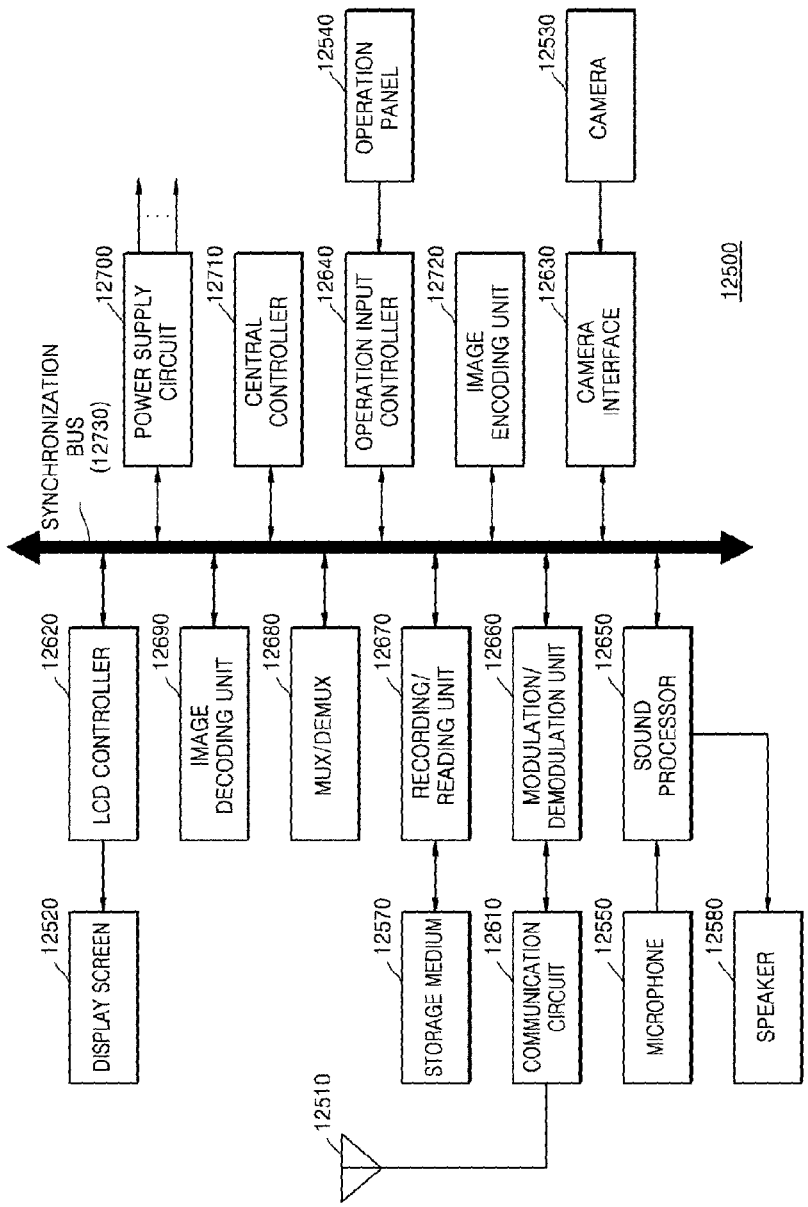

{Fig. 26}
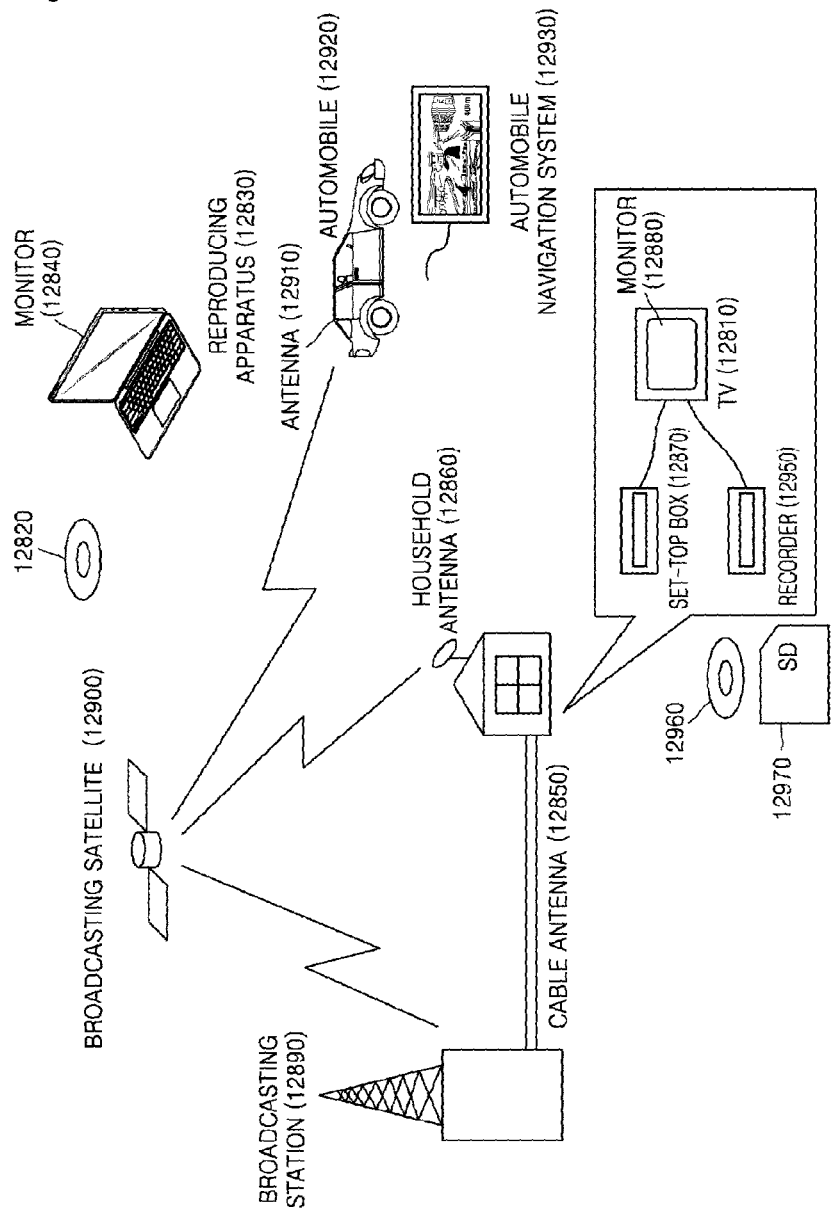

{Fig. 27}
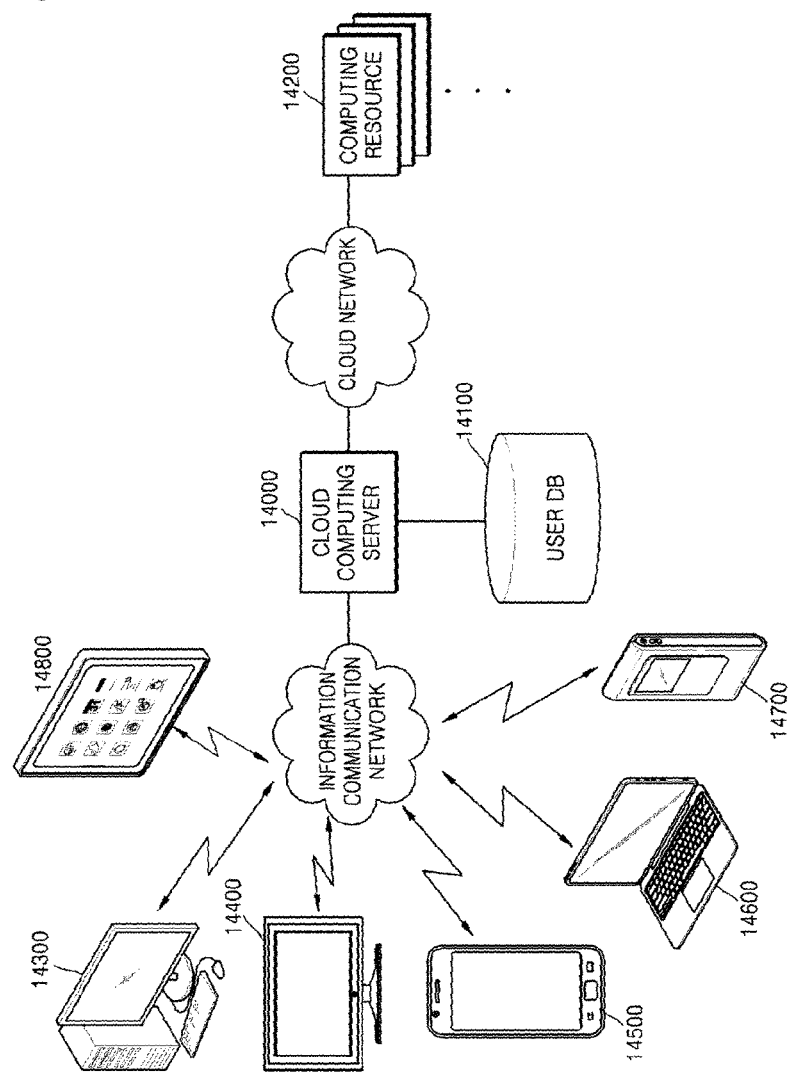

METHOD AND APPARATUS FOR PARALLEL VIDEO DECODING BASED ON MULTI-CORE SYSTEM

TECHNICAL FIELD

The present disclosure relates to video encoding and decoding methods and apparatuses, and more particularly, to multi-core system-based encoding and decoding.

BACKGROUND ART

As hardware for reproducing and storing high-resolution or high-quality video contents is being developed and supplied, there is a growing need for a video codec for effectively encoding or decoding high-resolution or high-quality video contents. Existing video codecs are designed to encode video on a basis of coding units having a tree structure according to a limited encoding method.

Image data in a spatial domain is transformed into coefficients in a frequency domain through frequency transformation. For fast frequency-transformation, a video codec divides an image into predetermined-sized blocks and performs discrete cosine transformation (DCT) on each of the blocks to encode frequency coefficients in units of the blocks. The existing compression systems perform block-based prediction to remove redundancies between color images. Existing compression systems generate parameters, which are to be used to perform video encoding and decoding, in units of pictures.

DISCLOSURE

Technical Problem

There are needs to improve decoding speed by using parallel decoding algorithm. However, prior arts did not provide the solutions using multi-core processor to realize parallel decoding algorithm

Technical Solution

According to an aspect of an embodiment, a video decoding method includes obtaining a motion vector of a current block belonging to a first picture from a bitstream, performed by a first decoding unit determining whether a reference block indicated by the motion vector is decoded, performed by the first decoding unit; and decoding the current block, based on whether the reference block is decoded, wherein the reference block is included in a second picture decoded by a second decoding unit, and the first picture and the second picture are decoded in parallel.

The obtaining of the motion vector of the current block may include obtaining the motion vector before the first picture is decoded. When the reference block is not decoded, the decoding of the current block may include starting decoding of the first picture after the reference block is decoded.

The obtaining of the motion vector of the current block may include obtaining a plurality of motion vectors of respective blocks belonging to the first picture from the bitstream. The determining of whether the reference block indicated by the motion vector is decoded may include determining whether a most delayed reference block is decoded among at least one reference block indicated by the plurality of motion vectors, wherein the mostly delayed reference block is decoded at a latest point of time. When the most delayed reference block is not decoded, the starting of the decoding of the first picture may include starting decoding of the first picture after the most delayed reference block is decoded.

The most delayed reference block may be determined based on a vertical component value of the motion vector indicating the reference block or a vertical coordinate of the reference block in the second picture.

The obtaining of the motion vector of the current block may include decoding at least one block of the first picture and obtaining the motion vector of the current block from the bitstream, performed by the first decoding unit. When the reference block is not decoded, the decoding of the current block may include decoding the current block by using the reference block after the reference block is decoded.

The decoding of the current block may include modifying the motion vector, performed by the first decoding unit when the reference block is not decoded; and decoding the current block by using the modified motion vector, performed by the first decoding unit.

The modifying of the motion vector may include modifying the motion vector to indicate one of decoded blocks of the second picture.

*12The modifying of the motion vector may include modifying a vertical component value of the motion vector to indicate a location on a decoded region of the second picture.

The modifying of the motion vector may include modifying a reference picture value of the motion vector to indicate another decoded picture.

The modifying of the motion vector may include determining at least one neighboring block belonging to the first picture and located near the current block; and modifying the motion vector according to one of motion vectors of the at least one neighboring block.

The decoding of the current block may include stopping the decoding of the current block when the reference block is not decoded; decoding the current block by using the reference block when the reference block is decoded within a preset time; modifying the motion vector when the reference block is not decoded within the preset time; and decoding the current block by using the modified motion vector, performed by the first decoding unit.

According to an aspect of another embodiment, a video decoding apparatus for performing parallel-decoding includes a first decoding unit configured to obtain a motion vector of a current block belonging to a first picture from a bitstream, determine whether a reference block indicated by the motion vector is decoded, and decode the current block based on whether the reference block is decoded; and a second decoding unit configured to decode a second picture including the reference block, wherein the first picture and the second picture are decoded in parallel.

The first decoding unit may obtain the motion vector before the first picture is decoded, and start decoding the first picture after the reference block is decoded, when the reference block is not decoded.

The first decoding unit may obtain the motion vector of the current block from the bitstream after at least one block of the first picture is decoded, and decode the current block by using the reference block after the reference block is decoded, when the reference block is not decoded.

When the reference block is not decoded, the first decoding unit may modify the motion vector to indicate one of decoded blocks of the second picture, and decode the current block by using the modified motion vector.

The first decoding unit may modify a vertical component value of the motion vector to indicate a location on a decoded region of the second picture.

The first decoding unit may modify a reference picture value of the motion vector to indicate another decoded picture.

The first decoding unit may determine at least one neighboring block belonging to the first picture and located near the current block, and modify the motion vector according to one of motion vectors of the at least one neighboring block.

The first decoding unit may stop decoding the current block when the reference block is not decoded, decode the current block by using the reference block when the reference block is decoded within a preset time, and modify the motion vector and decode the current block by using the modified motion vector when the reference block is not decoded within the preset time.

According to an aspect of another embodiment, there is provided a non-transitory computer-readable recording medium having recorded thereon a computer program for performing the video decoding method described above.

Advantageous Effects

Decoding speed will be improved by using parallel decoding algorithm.

DESCRIPTION OF DRAWINGS

These and/or other aspects will become apparent and more readily appreciated from the following description of the embodiments, taken in conjunction with the accompanying drawings in which:

FIG. 1A is a block diagram of an encoding apparatus;

FIG. 1B is a flowchart of an encoding method performed by an encoding apparatus;

FIG. 2A is a block diagram of a decoding apparatus according to an embodiment;

FIG. 2B is a flowchart of a method of performing parallel-decoding, performed by a decoding apparatus, according to an embodiment;

FIG. 3A is a flowchart of a method of performing parallel-decoding, performed by a decoding apparatus, according to another embodiment;

FIGS. 3B to 3D are conceptual diagrams illustrating a first picture and a second picture decoded by a first decoding unit and a second decoding unit, respectively;

FIG. 4A is a flowchart of a method of performing parallel-decoding, performed by a decoding apparatus, according to another embodiment;

FIGS. 4B to 4D are conceptual diagrams illustrating a case in which decoding is performed by a first decoding unit and a second decoding unit;

FIG. 4E is a flowchart of a method of performing parallel-decoding, performed by a decoding apparatus, according to another embodiment;

FIG. 5A is a flowchart of a method of performing parallel-decoding by changing a motion vector, performed by a decoding apparatus, according to another embodiment;

FIG. 5B is a flowchart of a method of performing parallel-decoding by changing a motion vector, performed by a decoding apparatus, according to another embodiment;

FIG. 5C is a conceptual diagram illustrating the method illustrated in FIG. 5B of performing parallel-decoding by changing a motion vector, performed by a decoding apparatus;

FIG. 6A is a flow chart of a method of performing parallel-decoding by changing a motion vector, performed by a decoding apparatus, according to another embodiment;

FIG. 6B is a conceptual diagram illustrating the method illustrated in FIG. 6A of performing parallel-decoding by changing a motion vector, performed by a decoding apparatus;

FIG. 7A is a flow chart of a method of performing parallel-decoding by changing a motion vector, performed by a decoding apparatus, according to another embodiment;

FIG. 7B is a conceptual diagram illustrating the method illustrated in FIG. 7A of performing parallel-decoding by changing a motion vector, performed by a decoding apparatus;

FIG. 8 is a block diagram of a video encoding apparatus based on a coding unit having a tree structure according to an embodiment;

FIG. 9 is a block diagram of a video decoding apparatus based on a coding unit having a tree structure according to an embodiment;

FIG. 10 illustrates a concept of coding units according to an embodiment;

FIG. 11 is a block diagram of a video encoding unit based on coding units according to an embodiment;

FIG. 12 is a block diagram of a video decoding unit based on coding units according to an embodiment;

FIG. 13 is a diagram illustrating coding units and partitions according to an embodiment;

FIG. 14 is a diagram illustrating a relationship between a coding unit and transformation units according to an embodiment;

FIG. 15 illustrates a plurality of pieces of encoding information according to various embodiments;

FIG. 16 is a diagram illustrating coding units corresponding to depths according to an embodiment;

FIGS. 17, 18 and 19 are diagrams illustrating a relationship between coding units, prediction units, and transformation units according to an embodiment;

FIG. 20 is a diagram illustrating a relationship between a coding unit, a prediction unit, and a transformation unit, according to encoding mode information;

FIG. 21 illustrates a physical structure of a disc that stores a program, according to an embodiment;

FIG. 22 illustrates a disc drive configured to record and read a program by using a disc;

FIG. 23 illustrates an entire structure of a content supply system configured to provide a content distribution service;

FIGS. 24 and 25 illustrate an external structure and an internal structure of a mobile phone to which a video encoding method and a video decoding method according to an embodiment are applicable;

FIG. 26 illustrates a digital broadcasting system employing a communication system according to an embodiment; and FIG. 27 illustrates a network structure of a cloud computing system using a video encoding apparatus and a video decoding apparatus according to an embodiment.

BEST MODE

According to an aspect of an embodiment, a video decoding method includes obtaining a motion vector of a current block belonging to a first picture from a bitstream, performed by a first decoding unit determining whether a reference block indicated by the motion vector is decoded, performed by the first decoding unit; and decoding the current block, based on whether the reference block is decoded, wherein the reference block is included in a second picture decoded by a second decoding unit, and the first picture and the second picture are decoded in parallel.

According to an aspect of another embodiment, a video decoding apparatus for performing parallel-decoding includes a first decoding unit configured to obtain a motion vector of a current block belonging to a first picture from a bitstream, determine whether a reference block indicated by the motion vector is decoded, and decode the current block based on whether the reference block is decoded; and a second decoding unit configured to decode a second picture including the reference block, wherein the first picture and the second picture are decoded in parallel.

MODE FOR INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term 'and/or' includes any and all combinations of one or more of the associated listed items. Expressions such as 'at least one of,' when preceding a list of elements, modify the entire list of elements and do not modify the individual elements of the list.

Video encoding methods and video decoding methods for signaling filter parameters by performing in-loop filtering according to various embodiments will be described with reference to FIGS. 1 to 7B below.

Also, a video encoding technique and a video decoding technique performed on a basis of coding units having a tree structure according to embodiments, which are applicable to the video encoding method and the video decoding method described above, will be described with reference to FIGS. 8 to 20 below. Also, various embodiments to which the video encoding method and the video decoding method described above are applicable will be described FIGS. 21 to 27 below.

In the present disclosure, the term 'image' should be understood to include a still image of video or a moving image, i.e., video.

Hereinafter, the term 'sample' means data assigned to a sampling location on an image, i.e., data to be processed. For example, pixels of an image in a spatial domain may be samples.

The term 'current block (current color block)' means a block of an image to be encoded or decoded. For example, a current block may be a block of a color image to be encoded or decoded. When a current image is encoded or decoded in a YCrCb format, a current block may be a luma block, a Cr block, or a Cb block. For example, the current block may be a block of a current picture to be currently encoded or decoded.

The term 'current image' means an image including a current block. For example, a current color image means a color image including a current block. In detail, the current color image means a color image including a block to be encoded or decoded.

The term 'neighboring block (neighboring block around a current block)' means a neighboring block of a current block. For example, a neighboring block may be located on an upper end, an upper right end, a left side, a lower left end, or an upper left end of the current block. A neighboring block may be an encoded or decoded block neighboring to the current block.

The term 'picture' means a still image of video consisting of a plurality of still images. According to an embodiment, a picture may be understood as a portion of a still image. A current picture means a picture to be currently decoded or encoded among pictures. A picture may be also referred to as a frame.

The term 'motion vector' means a vector representing a reference block to be referred to encode a current block when the current block is encoded using inter-prediction encoding performed to encode a block by referring to another block. A motion vector may include reference picture index information defining a reference picture, and location information of a reference block in the reference picture.

The picture index information may be determined using an index value of a current picture. For example, the picture index information may be determined to be a value relative to the index value of the current picture. The picture index information may be determined to be the difference between the index value of the current picture and an index value of the reference picture.

The location information of the reference block may be determined using a location value of a current block in the current picture. For example, the location information of the reference block may be determined to be a value relative to the location value of the current block. The location information of the reference block may be determined to be the difference between a location value of the reference block and the location value of the current block.

FIG. 1A is a block diagram of an encoding apparatus 10. The encoding apparatus 10 includes an encoding unit 12 and a bitstream generation unit 14. The encoding apparatus 10 receives an image, encodes the image, and generates an encoded bitstream.

The encoding unit 12 receives an image. The encoding unit 12 performs operations for encoding image data. The encoding unit 12 performs intra-prediction on an intra-mode coding unit, which is included in a current image, in units of prediction units. The encoding unit 12 performs inter-prediction on an inter-mode coding unit, which is included in the current image, in units of prediction units by using the current image and a reference image obtained from a restored-picture buffer.

The encoding unit 12 generates residual data by removing predicted data of coding unit of each mode from data of a coding unit of the current image which is to be encoded. The encoding unit 12 may output a transformation coefficient by quantizing the residual data in units of transformation units. The encoding unit 12 may restore the transformation coefficient to the residual data in a spatial domain. The encoding unit 12 may restore the residual data in the spatial domain to spatial-domain data of a coding unit of the current image by adding the residual data in the spatial domain to the predicted data of the coding unit of each mode. The restored image may be used as a reference image for inter-predicting another image.

The bitstream generation unit 14 receives encoded image data from the encoding unit 12 and outputs the encoded image data in the form of a bitstream. The bitstream generation unit 14 may entropy-encode a binary representation of encoded image data to convert the encoded image data into a shorter binary representation thereof. The bitstream generation unit 14 may output, in the form of a bitstream, the encoded image data on which entropy encoding is performed.

FIG. 1B is a flowchart of an encoding method performed by the encoding apparatus 10. First, the encoding apparatus 10 encodes an image (operation S111). The encoding apparatus 10 may receive an image. The encoding apparatus 10 performs intra-prediction on an intra-mode coding unit, which is included in a current image, in units of prediction units. The encoding apparatus 10 performs inter-prediction on an inter-mode coding unit, which is included in the current image, in units of prediction units by using the current image and a reference image obtained using a restored-picture buffer.

The encoding apparatus 10 generates residual data by removing predicted data of a coding unit of each mode from data a coding unit of a current image, which is to be encoded. The encoding apparatus 10 may output a transformation coefficient by quantizing the residual data in units of transformation units. The encoding apparatus 10 may restore the transformation coefficient to residual data in a spatial domain. The encoding apparatus 10 may restore the residual data in the spatial domain to spatial-domain data regarding a coding unit of the current image by adding the residual data in the spatial domain to predicted data of a coding unit of each mode. The restored image may be used as a reference image for inter-predicting another image.

Next, the encoding apparatus 10 generates a bitstream (operation S112). The encoding apparatus 10 outputs encoded image data in the form of a bitstream. The encoding apparatus 10 may entropy-encode a binary representation of the encoded image data to convert the encoded image data into a shorter binary representation thereof. The encoding apparatus 10 may output, in the form of a bitstream, the encoded image data on which entropy encoding is performed. FIG. 2A is a block diagram of a decoding apparatus 20 according to an embodiment.

The decoding apparatus 20 according to an embodiment will be described with reference to FIG. 2A below.

The decoding apparatus 20 according to an embodiment includes a bitstream parsing unit 22 and a decoding unit 24.

The bitstream parsing unit 22 parses a bitstream to obtain encoded image data to be decoded and encoding information for decoding the encoded image data.

The decoding unit 24 includes a first decoding unit 24a, a second decoding unit 24b, and a memory 24c. Although not shown, the decoding apparatus 20 according to an embodiment may further include another decoding unit. Although FIG. 2A illustrates only two decoding units, the decoding apparatus 20 may include a required number of decoding units according to an embodiment. For example, although not shown, the decoding apparatus 20 may further include a third decoding unit, a fourth decoding unit, etc.

The decoding unit 24 performs intra-prediction on an intra-mode coding unit in units of prediction units. The decoding unit 24 performs inter-prediction on an inter-mode coding unit included in a current image in units of prediction units by using a reference image.

Predicted data of a coding unit of each mode on which intra-prediction or inter-prediction is performed may be added to the residual data so as to restore spatial-domain data of a coding unit of a current image. The spatial-domain data may be output as a restored image. Restored images may be used as reference images.

The decoding unit 24 according to an embodiment includes a plurality of decoding units and performs parallel decoding. In the decoding unit 24 the decoding units 24a and 24b decode an encoded image in units of coding unit to perform parallel decoding.

Here, the predetermined coding units may be pictures. In a moving image consisting of consecutive still images, a picture may be still images corresponding to one hour. For example, the first decoding unit 24a may decode a first picture and a second decoding unit 24b may decode a second picture.

According to an embodiment, the decoding unit 24 may perform parallel decoding in units of tiles. Here, the tiles mean coding units divided from a picture, and one tile may be decoded indecently from another tile. For example, the first decoding unit 24a may decode a first tile of a first picture and the second decoding unit 24b may decode a second tile of the first picture.

The first decoding unit 24a and the second decoding unit 24b may decode coding units into images, and the images may be stored in the memory 24c to be output. The images stored in the memory 24c may be output to a display device or the like in an order in which the images are output.

A method of performing parallel-decoding, performed by the decoding apparatus 20 of FIG. 2A, according to an embodiment will be described with reference to FIG. 2B below. FIG. 2B is a flowchart of a method of performing parallel-decoding, performed by the decoding apparatus 20, according to an embodiment.

First, the decoding unit 24 obtains a motion vector of a current block belonging to a first picture from a bitstream (operation S211). The decoding unit 24 may obtain a motion vector of the current block from the bitstream.

The decoding unit 24 may parse the bitstream to obtain a plurality of coding elements for decoding an image from bitstream. The decoding unit 24 may obtain, from the bitstream, coding elements of a coding unit for performing parallel-decoding. The coding elements include a motion vector, and the difference between image data values of a reference block and the current block.

A specific coding unit on which parallel decoding is performed may be a picture. For example, when a specific coding unit on which parallel decoding is performed is a picture, the decoding unit 24 obtains coding elements regarding a specific picture from a bitstream. In the decoding apparatus 20 described above, the first decoding unit 24a may obtain coding elements regarding a first picture from a bitstream, and the second decoding unit 24b may obtain coding elements regarding a second picture from the bitstream. When the decoding apparatus 20 includes a third decoding unit (not shown), the third decoding unit may obtain coding elements regarding a third picture from the bitstream.

Next, the decoding unit 24 determines whether a reference block indicated by the motion vector is decoded (operation S212). For example, the decoding unit 24 may check whether the reference block indicated by the motion vector is decoded and stored in the memory 24c, and determine that the reference block is decoded when the reference block is stored in the memory 24c. The decoding unit 24 may check whether the reference block indicated by the motion vector is decoded and stored in the memory 24c, and determine that the reference block is not decoded when the reference block is not stored in the memory 24c. Similarly, when a restored image of a picture to which the reference block indicated by the motion vector belongs is stored in the memory 24c, the decoding unit 24 may determine the reference block is decoded.

Otherwise, when a reference picture is decoded depending on a reference order, the decoding unit 24 may determine whether the reference block is decoded by comparing an order of decoding the reference block with an order of decoding a current block of the reference picture which is being currently decoded. For example, when the order of decoding the reference block is earlier than the order of decoding the current block of the reference picture which is being currently decoded, it may be determined that the reference block is decoded. When the order of decoding the reference block is not earlier than the order of decoding the current block of the reference picture which is being currently decoded, it may be determined that the reference block is not decoded.

Next, the decoding unit 24 decodes the current block, based on whether the reference block is decoded (operation S213). A method of decoding the current block, which is performed by the decoding unit 24, based on whether the reference block is decoded will be described with reference to FIGS. 3A to 7B below.

A method of performing parallel-decoding, performed by the decoding apparatus 20, will be described with reference to FIGS. 3A to 3D below. FIG. 3A is a flowchart of a method of performing parallel-decoding, performed by the decoding apparatus 20, according to another embodiment. FIGS. 3B to 3D are conceptual diagrams illustrating a first picture and a second picture decoded by the first decoding unit 24*a* and the second decoding unit 24*b*, respectively.

Referring to FIGS. 3B to 3D, the first decoding unit 24*a* decodes a first picture indicated by (a) and the second decoding unit 24*b* decodes a second picture indicated by (b). Thus, the decoding apparatus 20 according to an embodiment may simultaneously decode the first picture and the second picture in parallel. The first decoding unit 24*a* may decode another picture that has yet to be decoded when the decoding of the first picture ends, and the second decoding unit 24*b* may decode another picture that has yet to be decoded when the decoding of the second picture ends.

For convenience of explanation, as illustrated in FIG. 3B, decoded portions 311 and 321 of each picture are illustrated to be light and non-decoded portions 312 and 322 of each picture are illustrated to be dark.

Referring to FIG. 3A, first, the first decoding unit 24*a* decodes the first picture (operation S311). The first decoding unit 24*a* may decode the first picture using a general decoding method. Otherwise, the first decoding unit 24*a* may decode the first picture using a decoding method according to an embodiment. A description of the second decoding unit 24*b* below is applicable to the first decoding unit 24*a*.

At the same time, the second decoding unit 24*b* decodes the second picture. A method of decoding the second picture, which is performed by the second decoding unit 24*b*, will be described in more detail below.

First, the second decoding unit 24*b* parses the second picture beforehand (operation S321). The second decoding unit 24*b* parses coding elements beforehand to be used to decode the second picture, prior to restoring the second picture. For example, the second decoding unit 24*b* may only parse encoded blocks of the second picture without decoding the encoded blocks of the second picture.

The second decoding unit 24*b* may parse a bitstream of the second picture beforehand to obtain motion vectors belonging to the second picture. FIG. 3B illustrates a case in which pictures are simultaneously and respectively decoded by the first decoding unit 24*a* and the second decoding unit 24*b*. As illustrated in FIG. 3B, a motion vector 324 of an encoded block 323 of the second picture which is parsed beforehand refers to a non-decoded region of the first picture. The second decoding unit 24*b* may parse a bitstream beforehand to obtain motion vectors of respective blocks belonging to the second picture from the bitstream.

Next, the second decoding unit 24*b* determines a decoding delay time of the second picture (operation S323). The second decoding unit 24*b* may determine whether a reference block indicated by a motion vector is decoded. When all of reference blocks referred to by motion vectors obtained from a bitstream to decode the second picture have been decoded, the second decoding unit 24*b* may determine the decoding delay time of the second picture to be '0'.

When at least one among the reference blocks referred to by the motion vectors is not decoded, the second decoding unit 24*b* determines a point of time when a mostly delayed reference block which is decoded at a latest point of time among the at least one reference block is to be decoded. For example, when a reference picture is decoded depending on a reference order, the second decoding unit 24*b* may predict a point of time when the most delayed reference block is to be decoded by comparing an order of decoding a reference block with an order of decoding a current block of the reference picture which is being currently decoded. Also, the second decoding unit 24*b* may determine a decoding delay time of the second picture, based on the point of time when the mostly delayed reference block is to be decoded.

The second decoding unit 24*b* may determine the mostly delayed reference block, based on a vertical component value of a motion vector or a vertical coordinate of a reference block included in a picture. For example, the second decoding unit 24*b* may determine, as the mostly delayed reference block, a reference block indicated by a motion vector having a highest vertical component value among motion vectors belonging to the second picture.

As another example, the second decoding unit 24*b* may determine, as the mostly delayed reference block, a reference block to be decoded at a latest time among the reference blocks, based on the location of an encoded block in the second picture and the location of a reference block determined by a motion vector to be used to decode the encoded block.

For example, the second decoding unit 24*b* may determine a vertical location of a reference block in a reference picture by adding a vertical location value of an encoded block and a vertical component value of a motion vector of the encoded block. The second decoding unit 24*b* may calculate vertical locations of a plurality of reference blocks as described above, and determine the mostly delayed reference block while taking account of an order in which blocks of a picture are decoded. For example, when encoded blocks located in a first row of a picture are first decoded and encoded blocks located in the other rows of the picture are sequentially decoded, a reference block located in a last row of the picture may be determined as the mostly delayed reference block.

In addition, reference blocks may be present in a plurality of reference pictures. In this case, the second decoding unit 24*b* may determine a mostly delayed reference block among reference blocks included in a reference picture to be decoded at a latest time according to the above method.

By using the mostly delayed reference block which is calculated as described above, the second decoding unit 24*b* may calculate time when the mostly delayed reference block is to be decoded, and determine the decoding delay time of the second picture such that decoding of the second picture starts after the calculated time.

Otherwise, the second decoding unit 24b may calculate the time difference between time when the mostly delayed reference block is decoded and time when a block is to be decoded by referring to the mostly delayed reference block, and determine the decoding delay time of the second picture such that decoding of the second picture starts after the calculated time difference.

Next, after the decoding delay time elapses, the second decoding unit 24b decodes the second picture (operation S325). As illustrated in FIG. 3C, the second decoding unit 24b may decode the second picture right after the reference block is decoded by delaying the decoding of the second picture by a decoding delay time determined by a point of time when the reference block of the reference picture is decoded. According to another embodiment, as illustrated in FIG. 3D, the second decoding unit 24b may decode the second picture after the reference picture is decoded by delaying the decoding of the second picture by a decoding delay time determined by a point of time when the decoding of the reference picture ends. After the decoding delay time elapses, the second decoding unit 24b may decode the second picture by decoding the current block 323 using a decoded reference block.

A method of performing parallel-decoding, performed by the decoding apparatus 20, according to another embodiment will be described with reference to FIG. 4A below. FIG. 4A is a flowchart of a method of performing parallel-decoding, performed by the decoding apparatus 20, according to another embodiment.

First, as described above, the first decoding unit 24a decodes a first picture (operation S411). At the same time, as illustrated in FIG. 4B, the second decoding unit 24b decodes a second picture. FIG. 4B illustrates a case in which decoding is performed by both the first decoding unit 24a and the second decoding unit 24b. Referring to FIG. 4B, the first decoding unit 24a decodes a current block 413 to decode a first picture a, and the second decoding unit 24b decodes a current block 423 to decode a second picture b.

The second decoding unit 24b obtains a motion vector of a current block to decode the current block (operation S421). Referring to FIG. 4C, the second decoding unit 24b obtains a motion vector 424 of the current block 423 to decode the current block 423. For example, the second decoding unit 24b decodes at least one block of the second picture and then obtains the motion vector of the current block to decode the current block.

Next, the second decoding unit 24b determines whether a reference block indicated by the motion vector is decoded (operation S423). Referring to FIG. 4C, the second decoding unit 24b determines whether a decoded reference block is referred to by the motion vector 424 of the current block 423 to decode the current block 423. Referring to FIG. 4C, a non-decoded region 412 of the first picture is indicated by the motion vector 424 of the current block 423. Thus, in FIG. 4C, the second decoding unit 24b determines that a non-decoded reference block is referred to by the motion vector 424 of the current block 423.

Next, when the reference block indicated by the motion vector is not decoded, the second decoding unit 24b stands by until the reference block is decoded (operation S425). While the second decoding unit 24b stands by without decoding the second picture until the reference block is decoded, the first decoding unit 24a continuously decodes the first picture.

When the reference block is decoded, the second decoding unit 24b decodes the current block (operation S427). Referring to FIG. 4D, when the reference block is decoded, the second decoding unit 24b may decode the current block 423 by predicting the current block 423 using the decoded reference block.

The second decoding unit 24b may continuously check whether a reference block is decoded. For example, the second decoding unit 24b may check whether a decoded reference block is stored in the memory 24c. Here, the memory 24c may be shared between the first decoding unit 24a and the second decoding unit 24b as described above. The first decoding unit 24a and the second decoding unit 24b may store decoded images in the memory 24c.

Otherwise, the second decoding unit 24b may request the first decoding unit 24a to inform whether a reference block is decoded. After the first decoding unit 24a decodes the reference block, the first decoding unit may transmit, to the second decoding unit 24b, a message informing that the reference block is decoded, in response to the request from the second decoding unit 24b. When the second decoding unit 24b receives the message from the first decoding unit 24a, the second decoding unit 24b may determine that the reference block is decoded.

The second decoding unit 24b may stand by only for a preset time until a reference block is decoded, and decode the current block by newly setting a motion vector when the reference block is not decoded within the preset time, unlike in the method described above with reference to FIG. 4A, as will be described with reference to FIG. 4E below. FIG. 4E is a flowchart of a method of performing parallel-decoding, performed by the decoding apparatus 20, according to another embodiment.

The second decoding unit 24b may obtain a motion vector of a current block (operation S421), determine whether a reference block indicated by the motion vector is decoded (operation S423), and stand by until the reference block is decoded when the reference block is not decoded (operation S425), similar to the method of FIG. 4A.

When the reference block is decoded within a preset time, the second decoding unit 24b may decode the current block using the reference block (operation S427). For example, when the reference block is decoded within the preset time, the second decoding unit 24b may cancel standing by, and decode the current block using the reference block to resume decoding a second picture. The second decoding unit 24b checks whether the reference block is decoded after the preset time, and decode the current block using the reference block to resume decoding the second picture when the reference block is decoded.

When the reference block is not decoded within the preset time, the second decoding unit 24b may determine a new reference block by changing the motion vector (operation S428). For example, the second decoding unit 24b may change the motion vector according to a method of changing a motion vector as will be described with reference to FIGS. 5A to 7B below. Then, the second decoding unit 24b may decode the current block using the new reference block (operation S429).

The preset time during which the second decoding unit 24b stands by until the reference block is decoded may be determined by parsing a motion vector of a current picture. For example, a predicted point of time when decoding of an encoded block starts is earlier by a predetermined time than a predicted point of time when decoding of a reference block referred to by the encoded block starts, a time during which the decoding of the encoded block stands by until the reference block is decoded is set to '0'. Thus, the encoded block may be decoded by referring to a reference block other than a reference block indicated by a motion vector parsed from a bitstream.

A method of changing a motion vector, performed by the decoding apparatus 20, according to another embodiment will be described with reference to FIGS. 5A to 7B.

FIG. 5A is a flowchart of a method of performing parallel-decoding by changing a motion vector, performed by the decoding apparatus 20, according to another embodiment. A method of performing parallel-decoding by changing a motion vector, performed by the decoding apparatus 20, according to another embodiment will be described with reference to FIG. 5A below.

The first decoding unit 24a decodes a first picture (operation S511). While the first decoding unit 24a decodes the first picture, the second decoding unit 24b decodes a second picture. Operations of the second decoding unit 24b will now be described. As described above, the operations of the second decoding unit 24b may also apply to the first decoding unit 24a.

First, the second decoding unit 24b obtains a motion vector of a current block (operation S521). The second decoding unit 24b may derive the motion vector of the current block using a merge mode or an AMVP mode. When the motion vector of the current block is derived using the merge mode or the AMVP mode, the second decoding unit may obtain the motion vector of the current block without changing other motion vectors to be referred to.

Next, the second decoding unit 24b determines whether a reference block indicated by the motion vector is decoded (operation S523).

Next, when the reference block is not decoded, the second decoding unit 24b changes the motion vector to indicate a decoded block among blocks of a first picture (operation S525). For example, when the reference block is not decoded, the second decoding unit 24b changes the motion vector to refer to another reference block. The second decoding unit 24b may change the motion vector to refer to a decoded block among the blocks of the first picture. Next, the second decoding unit 24b decodes the current block using a reference block indicated by the changed motion vector (operation S527).

FIG. 5B is a flowchart of a method of performing parallel-decoding by changing a motion vector, performed by the decoding apparatus 20, according to another embodiment The method of FIG. 5B will be described focusing on the differences from the method of FIG. 5A.

Differently from operation S525 in the method of FIG. 5A, operation S525a illustrated in FIG. 5B may be performed, in which a vertical component value of a motion vector is changed to indicate one location on a decoded region of a first picture when a reference block is not decoded. The second decoding unit 24b may change a vertical component value of a motion vector to indicate a location on a decoded region of a first picture. Next, the second decoding unit 24b may decode a current block using a reference block indicated by the changed motion vector (operation S527).

FIG. 5C is a conceptual diagram illustrating the method illustrated in FIG. 5B of performing parallel-decoding by changing a motion vector, performed by the decoding apparatus 20. Operation S525a will be described in more detail with reference to FIG. 5C below.

The second decoding unit 24b may check whether a region indicated by a motion vector 524 of a current block is decoded. Referring to FIG. 5C, the region indicated by the motion vector 524 of the current block indicates a non-decoded region 512 of a first picture a. Thus, the second decoding unit 24b may determine that the motion vector 524 of the current block indicates a non-decoded reference block.

Thus, the second decoding unit 24b may change the motion vector 524 of the current block to indicate a decoded region 511 of the first picture a. Referring to FIG. 5C, the second decoding unit 24b may generate a new motion vector 525 by changing a vertical component value of the motion vector 524 to indicate the decoded region 511 of the first picture a. For example, the second decoding unit 24b may change a vertical component value of the location of a reference block of the motion vector 524, which is included in location information of the reference block, to a vertical component value of a decoded region most adjacent to the motion vector in a vertical direction among decoded regions of the first picture a which is a reference picture.

When decoding is performed in a raster order in which decoding is sequentially performed from a first row to a last row, a block of a picture, which is current being decoded, may be a lowermost block of a decoded region. Based on this fact, the second decoding unit 24b may change the vertical component value of the motion vector 524 to a vertical component value of an upper block adjacent to a current block 513 of the first picture a (a reference picture) which is being currently decoded.

FIG. 6A is a flow chart of a method of performing parallel-decoding by changing a motion vector, performed by the decoding apparatus 20, according to another embodiment.

The method of FIG. 6A will be described focusing on the differences from the method of FIG. 5A.

Differently from operation S525 in the method of FIG. 5A, operation S525b illustrated in FIG. 6A may be performed, in which a reference picture value of a motion vector is changed to indicate another decoded picture when a reference block is not decoded. The second decoding unit 24b may change a reference picture value of a motion vector to indicate a decoded block.

Next, the second decoding unit 24b may decode a current block using a reference block indicated by the changed motion vector (operation S527).

*144FIG. 6B is a conceptual diagram illustrating the method illustrated in FIG. 6A of performing parallel-decoding by changing a motion vector, performed by the decoding apparatus 20. Operation S525b will be described in more detail with reference to FIG. 6B below.

The second decoding unit 24b may check whether a region indicated by a motion vector 524 of a current block is decoded. Referring to FIG. 6B, a non-decoded region 512 of a first picture is indicated by the motion vector 524 of the current block. Thus, the second decoding unit 24b may determine that a non-decoded reference block is indicated by the motion vector 524 of the current block.

Thus, the second decoding unit 24b may change the motion vector 524 of the current block to indicate a decoded region 511 of the first picture. Referring to FIG. 6B, the second decoding unit 24b may generate a new motion vector 526 by changing a reference picture value of the motion vector 524 to indicate a region of a third picture 10 that has already been decoded. The second decoding unit 24b may update reference picture index information of the motion vector 524 using the index of a restored picture decoded and stored in the memory 24c. For example, the second decoding unit 24b may update the reference picture value of the motion vector 524 to either a picture index value of a picture reproduced at a point of time nearest to a point of time when a first picture a which is a reference picture is reproduced among decoded pictures or a picture index value of a picture decoded at a point of time nearest to a point of time when the first picture a is decoded among decoded pictures.

Although all of regions of a picture are not decoded, the second decoding unit 24b may update the reference picture index information of the motion vector 524 by changing the reference picture value of the motion vector 524 such that a decoded picture is determined as a reference picture for a block in a picture referred to by the motion vector 524.

FIG. 7A is a flow chart of a method of performing parallel-decoding by changing a motion vector, performed by the decoding apparatus 20, according to another embodiment.

The method of FIG. 7A will be described focusing on the differences from the method of FIG. 5A.

Differently from operation S525 of FIG. 5A, operation S525c of FIG. 7A may be performed, in which a current motion vector is modified to a motion vector indicating a decoded reference block among motion vectors of at least one neighboring block when a reference block is not decoded. For example, the second decoding unit 24b may select one of neighboring blocks which belong to a second picture to be decoded and which are located near a current block. Then the second decoding unit 24b may change the current motion vector to be a motion vector indicating a decoded reference block among the motion vectors of the at least one neighboring block. Then the second decoding unit 24b may decode the current block using the decoded reference block indicated by the changed motion vector (operation S527).

FIG. 7B is a conceptual diagram illustrating the method illustrated in FIG. 7A of performing parallel-decoding by changing a motion vector, performed by the decoding apparatus 20. Operation S525c will be described in more detail with reference to FIG. 7B below.

In FIG. 7B, a motion vector 524 of a current block 523 of a second picture b decoded by the second decoding unit 24b indicates a non-decoded region of a first picture a decoded by the first decoding unit 24a. Thus, the second decoding unit 24b may determine a reference block of the current block 523 by replacing the motion vector 524 with the current block 523 to a motion vector 528 of a neighboring block 527.

Although FIG. 7 illustrates only the block 527 located on an upper end of the current block 523 as a neighboring block, blocks located on a left side, an upper left end, and an upper right end of the current block 523 may be also referred to as neighboring blocks as decoding is performed.

FIG. 8 is a block diagram of a video encoding apparatus 800 based on a coding unit having a tree structure according to an embodiment. A parallel decoding apparatus configured to perform parallel decoding according to an embodiment may include elements of the video encoding apparatus 800 which will be described below.

The video encoding apparatus 800 which performs video prediction based on a coding unit having a tree structure according to an embodiment includes a maximum coding unit split unit 810, a coding unit determination unit 820 and an output unit 830. For convenience of explanation, video encoding apparatus 800 which performs video prediction based on a coding unit having a tree structure according to an embodiment will be briefly referred to as 'the video encoding apparatus 800'.

The coding unit determination unit 820 may split a current picture of an image, based on a maximum coding unit which is a largest sized coding unit for the current picture. If the current picture is larger than the maximum coding unit, image data of the current picture may be split into at least one maximum coding unit. According to an embodiment, a maximum coding unit may be a square data unit, the width and height lengths of which are each a higher power of '2', e.g., a 32×32 coding unit, a 64×64 coding unit, a 128×128 coding unit, a 256×256 coding unit, etc.

According to an embodiment, a coding unit may be defined using a maximum size and a depth. Here, the term 'depth' means a number of times that a maximum coding unit is spatially split into coding units. As a depth increases, a coding unit for each depth may be split from a maximum coding unit to a minimum coding unit. A depth of the maximum coding unit may be defined as a highest depth, and the minimum coding unit may be defined as a lowest coding unit.

As the depth of the maximum coding unit increases, coding units corresponding to depths decrease in size. Thus, a coding unit of an upper depth may include coding units of lower depths.

As described above, image data of a current picture is split into maximum coding units according to a maximum size of a coding unit, and each of the maximum coding units include coding units that are split according to a depth. According to an embodiment, a maximum coding unit is split according to a depth and thus spatial-domain image data included in the maximum coding unit may be hierarchically classified according to the depth.

A maximum depth that limits a total number of times that the height and width of a maximum coding unit may be hierarchically split, and a maximum size of a coding unit may be preset.

The coding unit determination unit 820 determines a depth at which a final encoding result is to be output for each of at least one split region split from a maximum coding unit by encoding the at least split region according to a depth. That is, the coding unit determination unit 820 encodes image data in units of coding units of each of maximum coding units of a current picture according to a depth, and determines, as a final depth, a depth at which a least encoding error occurs. The determined final depth and image data included in each of maximum coding units are output to the output unit 830.

The image data included in each of the maximum coding units is encoded according to at least one depth which is less than or equal to the maximum depth, based on coding units corresponding to depths, and results of encoding the image based on the coding units corresponding to the depths are compared with each other. A depth at which a least encoding error occurs may be selected by comparing encoding errors of the coding units corresponding to the depths. At least one final depth may be determined for each of maximum coding units.

As a depth increases, a maximum coding unit is hierarchically split into coding units and thus the number of coding units increases. Even if coding units having the same depth are included in one maximum coding unit, encoding errors are measured for data included in these coding units and it is determined whether these coding units are to be split into coding units of a lower depth. Thus, since different encoding errors may occur, in units of depths, in even pieces of data included in one maximum coding unit according to the locations of the pieces of data, a final depth may vary according to the location of data. Thus, at least one final depth may be set for one maximum coding unit and data of the maximum coding unit may be split according to coding units of the at least one final depth.

Thus, according to an embodiment, the coding unit determination unit 820 may determine tree-structure coding units included in a current maximum coding unit. According to an embodiment, the 'tree-structure coding units' includes coding units having a depth determined as a final depth among coding units corresponding to all depths and included in the current maximum coding unit. The coding units having the final depth are hierarchically determined in the same region of a maximum coding unit and may be independently determined in different regions of the maximum coding unit. Similarly, a final depth for a current region may be determined independently from a final depth for another region.

According to an embodiment, a maximum depth is an index related to a number of times that a maximum coding unit is split to obtain a minimum coding unit. According to an embodiment, a first maximum depth may represent a total number of times that a maximum coding unit is split to obtain a minimum coding unit. According to an embodiment, a second maximum depth may represent a total number of levels from the maximum coding unit to the minimum coding unit. For example, when the maximum coding unit has a depth of 0, a depth of a coding unit obtained by splitting the maximum coding unit once may be set to '1' and a depth of a coding unit obtained by splitting the maximum coding unit twice may be set to '2'. In this case, when a coding unit obtained by splitting the maximum coding unit four times is the minimum coding unit, depths '0', '1', '2', 3, and '4' are present as depth levels. Thus, the first maximum depth may be set to '4' and the second maximum depth may be set to '5'.

Prediction-encoding and transformation may be performed on a maximum coding unit. Similarly, prediction-encoding and transformation may be performed on each of maximum coding units according to a depth which is less than or equal to a maximum depth, based on coding units corresponding to depths.

Whenever a maximum coding unit is split according to each of depths, the number of coding units corresponding to each of the depths increases. Thus, as a depth increases, encoding including prediction-encoding and transformation may be performed on coding units generated according to all depths. For convenience of explanation, prediction-encoding and transformation performed based on a coding having a current depth among at least one maximum coding unit will now be described.

According to an embodiment, the video encoding apparatus 800 may variously select a size or shape of a data unit for encoding image data. Various operations, e.g., prediction-encoding, transformation, entropy-encoding, etc., are performed on image data to encode the image data. The same data unit may be used or different data units may be used in the operations.

For example, the video encoding apparatus 800 may select not only coding units for encoding the image data but also data units which are different from the coding units to perform prediction-encoding on image data corresponding to each of the coding units.

According to an embodiment, for prediction-encoding a maximum coding unit, prediction-encoding may be performed based on a coding unit having a final depth, i.e., a coding unit that cannot be split any longer. Hereinafter, a coding unit that cannot be split any longer and based on which prediction-encoding is performed will be referred to as a 'prediction unit'. A partition split from the prediction unit may include the prediction unit, and a data unit obtained by splitting at least one of the height and width of the prediction unit. A partition is a data unit split from a prediction unit of a coding unit, and the prediction unit may have the same size as the coding unit.

For example, when a coding unit having a size of 2N×2N cannot be split any longer, the coding unit may be used as a prediction unit having a size of 2N×2N and partitions having sizes of 2N×2N, 2N×N, N×2N, N×N, etc. may be split from the partition. Here, 'N' denotes a positive integer. According to an embodiment, a partition mode may selectively include symmetrical partitions obtained by splitting the height or width of a prediction unit in symmetric ratios, partitions obtained by splitting the height or width of the prediction unit in asymmetric ratios, e.g., 1:n or n:1, partitions obtained by splitting the prediction unit into geometric patterns, patterns of arbitrary shapes, etc.

A prediction mode of a prediction unit may be at least one among an intra-mode, an inter-mode, and a skip mode. For example, the intra-mode and the inter-mode may be performed on partitions having sizes of 2N×2N, 2N×N, N×2N, and N×N. The skip mode may be performed only on partitions having a size of 2N×2N. Encoding may be independently performed on each of prediction units included in a coding unit, and a prediction mode having a least encoding error may be selected.

According to an embodiment, the video encoding apparatus 800 may transform image data of a coding unit, based on coding units for encoding the image data and data units that are different from the coding units. To transform the coding unit, the transformation may be performed based on a transformation unit that is equal to or less in size than the coding unit. For example, the transformation unit may include data units for the intra-mode and transformation units for the inter-mode.

Similar to a coding unit having a tree structure according to an embodiment, a transformation unit included in a coding unit may be recursively split into smaller-sized transformation units such that residual data of the coding unit is split according to a transformation depth, based on the transformation units having a tree structure.

According to an embodiment, a transformation depth representing a number of times that the height and width of a coding unit are split to obtain a transformation unit may be set. For example, a transformation depth may be set to '0' when the size of a transformation unit of a current coding unit having a size of 2N×2N is 2N×2N, may be set to '1' when the size of a transformation unit of the current coding unit having the size of 2N×2N is N×N, and may be set to '2' when the size of a transformation unit of the current coding unit having the size of 2N×2N is N/2×N/2 transformation unit. That is, a transformation unit having a tree structure may be also set according to a transformation depth.

Split information according to a depth includes not only a depth but prediction-related information and transformation-related information. Based on the split information, the coding unit determination unit 820 may determine not only a depth at which a least encoding error occurs but also a partition mode for splitting a prediction unit into partitions, a prediction mode for each of prediction units, the size of a transformation unit for performing transformation, etc.

According to an embodiment, a method of determining a coding unit having a tree structure, a prediction unit/partition, and a transformation unit of a maximum coding unit will be described in detail with reference to FIGS. 9 to 19 below.

The coding unit determination unit 820 may measure an encoding error of a coding unit corresponding to each of depths by using Lagrangian multiplier-based rate-distortion optimization.

The output unit 830 outputs, in the form of a bitstream, image data of a maximum coding unit encoded based on at least one depth determined by the coding unit determination unit 820 and split information corresponding to each of depths.

The encoded image data may be a result of encoding residual data of an image.

The split information corresponding to each of the depths may include information regarding the depth, information regarding a partition mode of a prediction unit, information regarding a prediction mode, split information of a transformation unit, etc.

Information regarding a final depth may be defined using the split information that corresponds to each of the depths and that represents whether encoding is to be performed using a coding unit of a lower depth rather than a current coding unit. When a current depth of a current coding unit is a final depth, the current coding unit is encoded on the current depth and thus split information of the current depth may be defined such that the current coding unit of the current depth is not split into lower coding units of a lower depth any longer. In contrast, when the current depth of the current coding unit is not the final depth, the current coding unit may be encoded using a coding unit of a lower depth and thus the split information of the current depth may be defined such that the current coding unit is split into coding units of a lower depth.

When the current depth is not the final depth, encoding is performed on a coding unit split into coding units of a lower depth. Since at least one coding unit of a lower depth is present in the coding unit of the current depth, encoding may be repeatedly performed on the at least one coding unit of the lower depth, thereby recursively encoding coding units of the same depth.

Coding units having a tree structure are determined for one maximum coding unit, and at least one piece of split information may be determined for a coding unit of each of depths. Thus, at least one piece of split information may be determined for one maximum coding unit. Also, data of the maximum coding unit may be hierarchically split according to a depth. Thus, a depth may vary according to the location of each piece of the data of the maximum coding unit. Accordingly, a depth and split information may be set for each piece of the data.

Thus, according to an embodiment, the output unit 830 may assign encoding information regarding a corresponding depth and an encoding mode to at least one among a coding unit, a prediction unit, and a minimum unit included in a maximum coding unit.

According to an embodiment, the minimum unit is a square data unit obtained by splitting a minimum coding unit of a lowest depth into four pieces. According to an embodiment, the minimum unit may be a maximum square data unit included in each of coding units, prediction units, partition units, and transformation units that are included in a maximum coding unit.

For example, encoding information output via the output unit 830 may be classified into encoding information for each of coding units corresponding to depths, and encoding information for each of prediction units. The encoding information for each of the coding units corresponding to the depths may include prediction mode information and partition size information. Encoding information transmitted in units of prediction units may include information regarding a direction in which an inter-mode is estimated, information regarding a reference image index in the inter-mode, information regarding a motion vector, information regarding chroma components in an intra-mode, information regarding an interpolation method in the intra-mode, etc.

Information regarding a maximum size of a coding unit, which is defined in units of pictures, slices, or group of pictures (GOPs), and information regarding a maximum depth may be inserted into a header of a bitstream, a sequence parameter set, a picture parameter set, or the like.

Information regarding a maximum size of a transformation unit allowed for current video, and information regarding a minimum size of the transformation unit may be also output using a header of a bitstream, a sequence parameter set, a picture parameter set, or the like. The output unit 830 may encode and output reference information, prediction information, slice-type information, etc. which are related to performing prediction.

In the video encoding apparatus 800 according to a simplest embodiment, coding units corresponding to depths are obtained by halving the height and width of a coding unit which is higher by one layer than them. That is, when a coding unit of a current depth has a size of 2N×2N, a coding unit of a lower depth has a size of N×N. A 2N×2N current coding unit may include four N×N coding units of a lower depth or less.

Thus, the video encoding apparatus 800 may form coding units having a tree structure by determining coding units having an optimum shape and size for each of maximum coding units, based on the size of the maximum coding units and a maximum depth determined in consideration of the characteristics of a current picture. Also, each of the maximum coding units may be encoded using various prediction modes, various transformation methods, etc. Accordingly, an optimum encoding mode may be determined in consideration of image characteristics of coding units of images having various sizes.

Thus, when an image having a very high resolution or an image including a very large amount of data is encoded in units of the existing macroblocks, the number of macroblocks per picture is excessively large. Thus, since the amount of compressed information generated for each of the macroblocks is large, transmitting the compressed information is burdensome and data compression efficiency decreases. Thus, according to an embodiment, a video encoding apparatus is capable of controlling coding units based on the characteristics of an image while increasing the maximum size of the coding units in consideration of the size of the image, thereby increasing an efficiency of compressing the image.

An interlayer video encoding apparatus including the elements described above with reference to FIG. 1A may include video encoding apparatuses 800, the number of which is equal to the number of layers of multi-layer video so as to encode single-layer images. For example, a first layer encoding unit may include one video encoding apparatus 800, and a second layer encoding unit may include video encoding apparatuses 800, the number of which is equal to the number of second layers.

When the video encoding apparatus 800 is configured to encode first-layer images, the coding unit determination unit 820 may determine a prediction unit for inter-image prediction in units of coding units having a tree structure of each of maximum coding units, and perform inter-image prediction on each of the prediction units.

Similarly, when the video encoding apparatus 800 is configured to encode second-layer images, the coding unit determination unit 820 may determine coding units having a tree structure and prediction units for each of maximum coding units, and perform inter-prediction on each of the prediction units.

The video encoding apparatus 800 may encode the difference between the brightnesses of a first-layer image and a second-layer image to compensate for the difference. However, it may be determined whether brightness compensation is to be performed according to an encoding mode of a coding unit. For example, brightness compensation may be performed only on prediction units having a size of 2N×2N.

FIG. 9 is a block diagram of a video decoding apparatus 900 based on a coding unit having a tree structure according to an embodiment.

The video decoding apparatus 900 according to an embodiment configured to perform video prediction based on coding units having a tree structure includes a receiving unit 910, an image data and encoding information extraction unit 920, and an image data decoding unit 930. For convenience of explanation, the video decoding apparatus 900 configured to perform video prediction based on coding units having a tree structure according to an embodiment will be briefly referred to as the 'video decoding apparatus 900'.

According to an embodiment, various terms 'coding unit', 'depth', 'prediction unit', 'transformation unit', 'split information', etc. related to a decoding operation of the video decoding apparatus 900 are as defined above with reference to FIG. 8 illustrating the video encoding apparatus 800.

The receiving unit 910 receives and parses a bitstream of encoded video. The image data and encoding information extraction unit 920 extracts image data encoded for each of coding units, from the parsed bitstream in units of maximum coding units, based on coding units having a tree structure, and outputs the extracted encoded image data to the image data decoding unit 930. The image data and encoding information extraction unit 920 may extract information regarding a maximum size of coding units of a current picture from a header, a sequence parameter set, or a picture parameter set for the current picture.

Also, the image data and encoding information extraction unit 920 extracts a final depth and split information regarding the coding units having the tree structure from the parsed bitstream in units of the maximum coding units. The extracted final depth and split information are output to the image data decoding unit 930. That is, a bit string of the image data may be split into maximum coding units so that the image data decoding unit 930 may decode the image data in units of the maximum coding units.

A depth and split information for each of the maximum coding units may be set for at least one piece of depth information. Split information corresponding to each of depths may include partition-mode information, prediction-mode information regarding a corresponding coding unit, split information for a transformation unit, etc. Also, the split information corresponding to each of the depths may be extracted as depth information.

The depth information and the split information extracted by the image data and encoding information extraction unit 920 in units of the maximum coding units are determined by generating a least encoding error by repeatedly performing encoding on coding units corresponding to depths in maximum coding units at an encoding side as in the video encoding apparatus 800 according to an embodiment. Thus, the video decoding apparatus 900 may restore an image by decoding data based on an encoding method causing a least encoding error to occur.

According to an embodiment, since encoding information regarding a depth and an encoding mode may be assigned to a predetermined data unit among a coding unit, a prediction unit, and a minimum unit corresponding thereto, the image data and encoding information extraction unit 920 may extract a depth and split information on a basis of the predetermined data unit. When a depth and split information of a corresponding maximum coding unit are recorded on the basis of the predetermined data unit, predetermined data units having the same depth and split information may be considered as being included in the same maximum coding unit.

The image data decoding unit 930 restores the current picture by decoding image data of each of maximum coding units, based on a depth and split information for each of the maximum coding units. That is, the image data decoding unit 930 may decode the encoded image data, based on a partition mode, a prediction mode, and a transformation unit read for each of coding units having a tree structure included in the maximum coding units. The decoding of the encoded image data may include a prediction process including intra-prediction and motion compensation, and an inverse transformation process.

The image data decoding unit 930 may perform intra-prediction or motion compensation on coding units corresponding to depths according to partitions and a prediction mode of each of the coding units, based on partition mode information and prediction mode information of a prediction unit of each of the coding units.

Also, in order to perform inverse transformation in units of maximum coding units, the image data decoding unit 930 may read transformation unit information according to a tree structure for each of the coding units and perform inverse transformation on each of the coding units based on transformation units. Pixel values of the coding units in a spatial domain may be restored through inverse transformation.

The image data decoding unit 930 may determine a depth of a current maximum coding unit by using split information corresponding to depths. If the split information represents that a current coding unit of a current depth cannot be split any longer, the current depth is a final depth. Thus, the image data decoding unit 930 may decode image data of the current maximum coding unit on a basis of a coding unit of the current depth by using a partition mode and a prediction mode of a prediction unit and size information of a transformation unit.

That is, encoding information set for predetermined data units among coding units, prediction units, and minimum units may be checked, and data units including encoding information including the same split information may be then regarded collectively as one data unit to be decoded using the same encoding mode by the image data decoding unit 930. The current coding unit may be decoded by obtaining information regarding an encoding mode of each of coding units determined as described above.

An interlayer video decoding apparatus including the elements as described above with reference to FIG. 2A may include a number of video decoding apparatuses 900 corresponding to the number of viewpoints so as to restore first-layer images and second-layer images by decoding a received first-layer image stream and second-layer image stream.

When the first-layer image stream is received, the image data decoding unit 930 of the video decoding apparatus 900 may divide samples of the first-layer images extracted from the first-layer image stream by the extraction unit 920 into coding units having a tree structure of a maximum coding unit. The image data decoding unit 930 may restore the first-layer images by performing motion compensation on the coding units having the tree structure of the samples of the first-layer images in units of prediction units for inter-image prediction.

When the second-layer image stream is received, the image data decoding unit 930 of the video decoding apparatus 900 may divide samples of the second-layer images extracted from the second-layer image stream by the extraction unit 920 into coding units having a tree structure of a maximum coding unit. The image data decoding unit 930 may restore the second-layer images by performing motion compensation on the coding units having the tree structure of the samples of the second-layer images in units of prediction units for inter-image prediction.

The extraction unit 920 may obtain information related to a brightness error from the bitstream so as to compensate for the difference between the brightnesses of the first-layer image and the second-layer image. Whether brightness compensation is to be performed according to an encoding mode of a coding unit may be determined. For example, brightness compensation may be performed only on prediction units having a size of 2N×2N.

Thus, the video decoding apparatus 900 may obtain information regarding a coding unit in which a least encoding error occurs when encoding is recursively performed on each of maximum coding units in an encoding process, and use the information to decode the current picture. That is, encoded image data of optimum coding units having a tree structure determined for each of the maximum coding units may be decoded.

Thus, even an image having a high resolution or an image having an excessive large amount of data may be restored by efficiently decoding image data thereof using the size of coding units and an encoding mode that are adaptively determined according to the characteristics of the image, based on optimum split information transmitted from an encoding side.

FIG. 10 illustrates a concept of coding units according to an embodiment.

A size of a coding unit may be expressed in width×height, and examples of a coding unit may include coding units having sizes of 64×64, 32×32, 16×16, and 8×8. A coding unit having a size of 64×64 may be split into partitions having sizes of 64×64, 64×32, 32×64, and 32×32. A coding unit of 32×32 may be split into partitions having sizes of 32×32, 32×16, 16×32, and 16×16. A coding unit of 16×16 may be split into partitions having sizes of 16×16, 16×8, 8×16, or 8×8. A coding unit having a size of 8×8 may be split into partitions having sizes of 8×8, 8×4, 4×8, and 4×4.

In video data 1010, a resolution is 1920×1080, a maximum size of a coding unit is 64, and a maximum depth is 2. In video data 1020, a resolution is 1920×1080, a maximum size of a coding unit is 64, and a maximum depth is 3. In video data 1030, a resolution is 352×288, a maximum size of a coding unit is 16, and a maximum depth is 1. The maximum depth shown in FIG. 10 represents a total number of splits from a maximum coding unit to a minimum decoding unit.

If a resolution is high or an amount of data is large, a maximum size of a coding unit may be relatively large to not only increase encoding efficiency but also to accurately reflect characteristics of an image. Accordingly, the maximum size of the coding unit of the video data 1010 and 1020 having the higher resolutions than the video data 1030 may be 64.

Since the maximum depth of the video data 1010 is 2, coding units 1015 of the vide data 1010 may include a maximum coding unit having a long axis size of 64, and coding units having long axis sizes of 32 and 16 since depths thereof are deepened to two layers by splitting the maximum coding unit twice. Meanwhile, since the maximum depth of the video data 1030 is 1, coding units 1035 of the video data 1030 may include a maximum coding unit having a long axis size of 16, and coding units having a long axis size of 8 since depths thereof are deepened to one layer by splitting the maximum coding unit once.

Since the maximum depth of the video data 1020 is 3, coding units 1025 of the video data 1020 may include a maximum coding unit having a long axis size of 64, and coding units having long axis sizes of 32, 16, and 8 since the depths thereof are deepened to three layers by splitting the maximum coding unit three times. As a depth deepens, detailed information may be precisely expressed.

*222FIG. 11 is a block diagram of a video encoding unit 1100 based on coding units according to an embodiment.

According to an embodiment, the video encoding unit 1100 performs operations of the picture encoding unit 1520 of the video encoding apparatus 800 to encode image data.

Specifically, an intra-prediction unit 1120 performs intra prediction on coding units of a current image 1105 in an intra-mode in units of prediction units. An inter-prediction unit 1115 performs inter-prediction on coding units in an inter-mode in units of prediction units by using reference images obtained from the current image 1105 and a restored-picture buffer 1110. The current image 1105 may be split into maximum coding units and encoding may be sequentially performed on the maximum coding units. In this case, encoding may be coding units having a tree structure split from each of the maximum coding units.

Residual data is generated by removing predicted data of the coding units of each mode, which is output from the intra-prediction unit 1120 or the inter-prediction unit 1115, from data of encoded coding units of the current image 1105. The residual data is transformed, quantized, and output as transformation coefficients quantized in transform units while passing through a transformation unit 1125 and a quantization unit 1130. The quantized transformation coefficients are restored to residual data in a spatial domain by an inverse quantization unit 1145 and an inverse transformation unit 1150. The restored residual data in the spatial domain is added to the predicted data of the coding units of each mode, which is output from the intra-prediction unit 1120 or the inter-prediction unit 1115, to restore to data in a spatial domain of the coding units of the current image 1105. The restored data in the spatial domain is converted into a restored image while passing through a deblocking unit 1155 and a sample adaptive offset (SAO) performing unit 1160. The restored image is stored in the restored-picture buffer 1110. Restored images stored in the restored-picture buffer 1110 may be used as reference images for performing inter-prediction on other images. The transformation coefficients quantized by the transformation unit 1125 and the quantization unit 1130 may pass through an entropy-encoding unit 1135 and be then output in a bitstream 1140.

According to an embodiment, in order to apply the video encoding unit 1100 to the video encoding apparatus 800, all elements of the video encoding unit 1100 (i.e., the inter-prediction unit 1115, the intra-prediction unit 1120, the transformation unit 1125, the quantization unit 1130, the entropy-encoding unit 1135, the inverse quantization unit 1145, the inverse transformation unit 1150, the deblocking unit 1155, the SAO performing unit 1160, and the ALF performing unit 1170) perform operations based on each of coding units having a tree structure of each of the maximum coding units.

In particular, the intra-prediction unit 1120 and the inter-prediction unit 1115 may determine a partition mode and a prediction mode of each of the coding units having the tree structure while considering the maximum size and the maximum depth of a current maximum coding unit. The transformation unit 1125 may determine whether a transformation unit having a quad-tree included in each of the coding units having the tree structure is to be split.

FIG. 12 is a block diagram of a video decoding unit 1200 based on coding units according to an embodiment.

An entropy-decoding unit 1215 parses a bitstream 1205 to obtain encoded image data to be decoded and encoding information needed to decode the encoded image data. The encoded image data is quantized transformation coefficients, and residual data is restored from the quantized transformation coefficients by an inverse quantization unit 1220 and an inverse transformation unit 1225.

An intra-prediction unit 1240 performs intra-prediction on coding units in an intra-mode in units of prediction units. An inter-prediction unit 1235 performs inter-prediction on coding units in an inter-mode of a current image in units of prediction units, based on a reference image obtained from a restored-picture buffer 1230.

Predicted data of coding units of each mode obtained while passing through the intra-prediction unit 1240 or the inter-prediction unit 1235 and the residual data may be added together to restore data in a spatial domain of coding units of a current image, and the restored data in the spatial domain may be output as an output video 1260 while passing through a deblocking unit 1245, an SAO performing unit 1250, and an ALF performing unit 1260. Restored images stored in the restored-picture buffer 1230 may be output as reference images.

According to an embodiment, in order to decode the encoded image data using the picture decoding unit 930 of the video decoding apparatus 900, operations to be performed after an operation of the entropy-decoding unit 1215 of the video decoding unit 1200 may be performed.

In order to apply the video decoding unit 1200 to the video decoding unit 1200 according to an embodiment, all elements of the video decoding unit 1200 (i.e., the entropy-decoding unit 1215, the inverse quantization unit 1220, the inverse transformation unit 1225, the intra-prediction unit 1240, the inter-prediction unit 1235, the deblocking unit 1245, the SAO performing unit 1250, and the ALF performing unit 1260) may perform operations based on coding units having a tree structure, in units of maximum coding units.

In particular, the intra-prediction unit 1240 and the inter-prediction unit 1235 may determine a partition mode and a prediction mode for each of coding units having a tree structure, and the inverse transformation unit 1225 may determine whether a transformation unit having a quad-tree included in each of the coding units is to be split.

The encoding operation and the decoding operation described above with reference to FIGS. 10 and 11 are a video stream encoding operation and a video stream decoding operation performed at a single layer. Thus, when the encoding unit 12 of FIG. 1A encodes a video stream of two or more layers, two or more image encoding units 1100 may be provided to correspond to the two or more layers, respectively. Similarly, when the decoding unit 24 of FIG. 2A decodes a video stream of two or more layers, two or more image decoding units 1200 may be provided to correspond to the two or more layers, respectively.

FIG. 13 is a diagram illustrating coding units corresponding to depths and partitions according to an embodiment.

The video encoding apparatus 800 and the video decoding apparatus 900 according to an embodiment use hierarchical coding units to consider characteristics of an image. A maximum height, a maximum width, and a maximum depth of a coding unit may be adaptively determined according to the characteristics of the image or may be differently set according to a user's request. Sizes of coding units corresponding to depths may be determined according to a predetermined maximum size of a coding unit.

*237According to an embodiment, in a hierarchical structure 1300 of coding units according to an embodiment, the maximum height and width of the coding units are each 64 and the maximum depth is 3. The maximum depth denotes a total number of splitting times from a maximum coding unit to a minimum coding unit. According to an embodiment, since a depth deepens along a vertical axis of the hierarchical structure 1300, a height and width of each of coding units corresponding to depths are each split. Also, a prediction unit and partitions, which are bases for prediction-encoding each of the coding units corresponding to depths, are shown along a horizontal axis of the hierarchical structure 1300.

That is, in the hierarchical structure 1300 of the coding units, a coding unit 1310 is a maximum coding unit having a depth is 0 and a size of 64×64 (height×width). As the depth deepens along the vertical axis, a coding unit 1320 having a size of 32×32 and a depth of 1, a coding unit 1330 having a size of 16×16 and a depth of 2, and a coding unit 1340 having a size of 8×8 and a depth of 3 exist. The coding unit 1340 having the size of 8×8 and the depth of 3 is a minimum coding unit.

A prediction unit and partitions of each of the coding units are arranged along the horizontal axis according to each depth. That is, if the coding unit 1310 having the size of 64×64 and the depth of 0 is a prediction unit, the prediction unit may be split into partitions included in the coding unit 1310, i.e. a partition 1310 having a size of 64×64, partitions 1312 having a size of 64×32, partitions 1314 having a size of 32×64, or partitions 1316 having a size of 32×32.

Similarly, a prediction unit of the coding unit 1320 having the size of 32×32 and the depth of 1 may be split into partitions included in the coding unit 1320, i.e. a partition 1320 having a size of 32×32, partitions 1322 having a size of 32×16, partitions 1324 having a size of 16×32, and partitions 1326 having a size of 16×16.

Similarly, a prediction unit of the coding unit 1330 having the size of 16×16 and the depth of 2 may be split into partitions included in the coding unit 1330, i.e. a partition 1330 having a size of 16×16, partitions 1332 having a size of 16×8, partitions 1334 having a size of 8×16, and partitions 1336 having a size of 8×8.

Similarly, a prediction unit of the coding unit 1340 having the size of 8×8 and the depth of 3 may be split into partitions included in the coding unit 1340, i.e. a partition 1340 having a size of 8×8, partitions 1342 having a size of 8×4, partitions 1344 having a size of 4×8, and partitions 1346 having a size of 4×4.

According to an embodiment, the coding unit determination unit 820 of the video encoding apparatus 800 may encode each of the coding units corresponding to depths of the maximum coding unit 1310 so as to determine a depth of the maximum coding unit 1310.

As the depth deepens, a number of coding units corresponding to each depth and including data having the same range and size increases. For example, four coding units corresponding to a depth of 2 are required to cover data included in one coding unit corresponding to a depth of 1. Accordingly, in order to compare results of encoding the same data according to depths, the coding unit corresponding to the depth of 1 and the four coding units corresponding to the depth of 2 are each encoded.

In order to perform encoding in units of depths, a least encoding error of each of the depths may be selected as a representative encoding error by encoding prediction units in each of the coding units corresponding to the depths, along the horizontal axis of the hierarchical structure 1300. Alternatively, a least encoding error may be searched for by performing encoding in units of depths and comparing least encoding errors according to the depths, as the depth deepens along the vertical axis of the hierarchical structure 600. A depth and a partition having the least encoding error in the maximum coding unit 1310 may be selected as a depth and a partition mode of the maximum coding unit 1310.

FIG. 14 is a diagram illustrating a relationship between a coding unit and transformation units according to an embodiment.

The video encoding apparatus 800 or the video decoding apparatus 900 according to an embodiment encodes or decodes an image in units of maximum coding units, based on coding units having sizes less than or equal to the sizes of the maximum coding units. During the encoding, a size of each transformation unit used to perform transformation may be selected based on a data unit that is not larger than a corresponding coding unit.

For example, in the video encoding apparatus 800 or the video decoding apparatus 900 according to an embodiment, if a size of a coding unit 1410 is 64×64, transformation may be performed using transformation units 1420 having a size of 32×32.

Also, data of the coding unit 110 having the size of 64×64 may be encoded by performing transformation on each of transformation units having a size of 32×32, 16×16, 8×8, and 4×4, which are smaller than 64×64, and then a transformation unit having a least coding error may be selected.

FIG. 15 illustrates a plurality of pieces of encoding information according to various embodiments.

According to an embodiment, the output unit 830 of the video encoding apparatus 800 may encode and transmit, as split information, information 1500 regarding a partition mode, information 1510 regarding a prediction mode, and information 1520 regarding transformation unit size for each of coding units corresponding to depths.

The information 1500 indicates information regarding a shape of a partition obtained by splitting a prediction unit of a current coding unit, as a data unit for prediction-encoding the current coding unit. For example, a current coding unit CU_0 having a size of 2N×2N may be split into any one of a partition 1502 having a size of 2N×2N, a partition 1504 having a size of 2N×N, a partition 1506 having a size of N×2N, and a partition 1508 having a size of N×N. In this case, the information 1500 is set to indicate one of the partition 1504 having a size of 2N×N, the partition 1506 having a size of N×2N, and the partition 1508 having a size of N×N.

The information 1510 indicates a prediction mode of each partition. For example, the information 1510 may set to indicate whether a partition indicated by the information 1500 is to be prediction-encoded according to an intra-mode 1512, an inter-mode 1514, or a skip mode 1516.

The information 1520 indicates a transformation unit to be based on when transformation is performed on a current coding unit. For example, the transformation unit may be a first intra-transformation unit 1522, a second intra-transformation unit 1524, a first inter-transformation unit 1526, or a second intra-transformation unit 1528.

According to an embodiment, the image data and encoding information extraction unit 920 of the video decoding apparatus 900 may extract the information 1500 regarding the partition mode, the information 1510 regarding the prediction mode, and the information 1520 regarding the transformation unit size for each of the coding units corresponding to depths, and use the extracted information in performing decoding.

FIG. 16 is a diagram illustrating coding units corresponding to depths according to an embodiment.

Split information may be used to represent a depth change. The spilt information indicates whether a coding unit of a current depth is to be split into coding units of a lower depth.

A prediction unit 1610 for prediction-encoding a coding unit 1600 having a depth of 0 and a size of 2N_0×2N_0 may include a partition mode 1618 including of a partition mode 1612 having a size of 2N_0×2N_0, a partition mode 1614 having a size of 2N_0×N_0, a partition mode 1616 having a size of N_0×2N_0, and a partition mode 1618 having a size of N_0×N_0. Although FIG. 16 illustrates only the partition modes 1612 through 1618 obtained by symmetrically splitting the prediction unit 1610, the partitions of the prediction unit 1610 are not limited thereto and may include asymmetrical partitions, partitions having an arbitrary shape, partitions having a geometrical shape, etc. as described above.

Prediction-encoding may be repeatedly performed one partition having a size of 2N_0×2N_0, two partitions having a size of 2N_0×N_0, two partitions having a size of N_0×2N_0, and four partitions having a size of N_0×N_0, according to each of partition modes. Prediction-encoding may be performed on the partitions having the sizes of 2N_0×2N_0, N_0×2N_0, 2N_0×N_0, and N_0×N_0, according to an intra-mode and an inter-mode. Prediction-encoding is performed only on the partition having the size of 2N_0×2N_0, according to a skip mode.

If an encoding error is smallest in one of the partition modes 1612, 1614, and 1616 having the sizes of 2N_0× 2N_0, 2N_0×N_0, and N_0×2N_0, the prediction unit 1610 may not be split into a lower depth.

If an encoding error is the smallest in the partition mode 1618 having the size of size of N_0×N_0, a depth may be changed from 0 to 1 to split the partition mode 1618 in operation 1620, and encoding may be repeatedly performed on coding units 1630 having partition modes of a depth of 2 and a size of N_0×N_0 to search for a least encoding error.

A prediction unit 1640 for prediction-encoding the coding unit 1630 having a depth of 1 and a size of 2N_1×2N_1 (=N_0×N_0) may include a partition mode 1642 having a size of 2N_1×2N_1, a partition mode 1644 having a size of 2N_1×N_1, a partition mode 1646 having a size of N_1× 2N_1, and a partition mode 1648 having a size of N_1×N_1.

If an encoding error is the smallest in the partition mode 1648 having a size of N_1×N_1, a depth may be changed from 1 to 2 to split the partition mode 948 in operation 1650, and encoding may be repeatedly performed on coding units 1660 having a depth of 2 and a size of N_2×N_2 so as to search for a least encoding error.

When a maximum depth is d, coding units corresponding to depths may be set up to when a depth becomes (d−1), and split information may be set up to when a depth is (d−2). That is, when encoding is performed up to when the depth is d−1 after a coding unit corresponding to a depth of (d−2) is split in operation 1670, a prediction unit 1690 for prediction-encoding a coding unit 1680 having a depth of (d−1) and a size of 2N (d−1)×2N (d−1) may include a partition mode 1692 having a size of 2N_(d−1)×2N_(d−1), a partition mode 1694 having a size of 2N_(d−1)×N_(d−1), a partition mode 1696 having a size of N_(d−1)×2N_(d−1), and a partition mode 1698 having a size of N_(d−1)×N_(d−1).

Prediction-encoding may be repeatedly performed on one partition having a size of 2N_(d−1)×2N_(d−1), two partitions having a size of 2N_(d−1)×N_(d−1), two partitions having a size of N_(d−1)×2N_(d−1), and four partitions having a size of N_(d−1)×N_(d−1) from among the above partition modes so as to search for a partition mode having a least encoding error.

Even when the partition mode 1698 having the size of N_(d−1)×N_(d−1) has a least encoding error, since a maximum depth is d, a coding unit CU_(d−1) having a depth of (d−1) is no longer split to a lower depth, and a depth for a current maximum coding unit 1600 is determined to be (d−1) and a partition mode thereof may be determined to be N_(d−1)×N_(d−1). Also, since the maximum depth is d, split information is not set for a coding unit 1652 having a depth of (d−1).

A data unit 1699 may be referred to as a 'minimum unit' for a current maximum coding unit. A minimum unit according to an embodiment may be a square data unit obtained by splitting a minimum coding unit having a lowest depth by 4. By performing encoding repeatedly as described above, the video encoding apparatus 800 according to an embodiment may determine a depth by comparing encoding errors according to depths of the coding unit 1600 and selecting a depth having a least encoding error, and set a corresponding partition mode and prediction mode as an encoding mode of the depth.

As such, least encoding errors according to depths, i.e., the depths of 0, 1, . . . , (d−1), and d, are compared with one another, and a depth having a least encoding error may be determined as a depth. The depth, the partition mode of the prediction unit, and the prediction mode may be encoded and transmitted as split information. Also, since a coding unit is split from the depth of 0 to the depth, only split information of the depth is set to 0, and split information of the other depths excluding the depth is set to 1.

According to an embodiment, the image data and encoding information extraction unit 920 of the video decoding apparatus 900 may extract and use the information regarding the depth and the prediction unit of the coding unit 1600 to decode the partition mode 1612. According to an embodiment, the video decoding apparatus 900 may determine a depth corresponding to split information '0' as the depth, based on split information according to depths, and use split information for the depth in performing decoding.

FIGS. 17, 18 and 19 are diagrams illustrating a relationship between coding units, prediction units, and transformation units according to an embodiment.

Coding units 1710 are coding units corresponding to depths for a maximum coding unit, determined by the video encoding apparatus 800, according to an embodiment. Prediction units 1760 are partitions of prediction units of the respective coding units 1710 corresponding to depths. Transformation units 1770 are transformation units of the respective coding units 1710.

Among the coding units 1710 corresponding to depths, if a depth of a maximum coding unit is 0, then coding units 1712 and 1754 have a depth of 1, coding units 1714, 1716, 1718, 1728, 1750, and 1752 have a depth of 2, coding units 1720, 1722, 1724, 1726, 1730, 1732, and 1748 have a depth of 3, and coding units 1740, 1742, 1744, and 1746 have a depth of 4.

Among the prediction units 1760, some partitions 1714, 1716, 1722, 1732, 1748, 1750, 1752, and 1754 are split from coding units. That is, the partitions 1714, 1722, 1750, and 1754 are 2N×N partition modes, the partitions 1716, 1748, and 1752 are N×2N partition modes, and the partition 1732 is an N×N partition mode. Prediction units and partitions of the coding units 1710 are smaller than or equal to coding units corresponding thereto.

Among the transformation units 1770, image data of some transformation units 1752 is transformed or inversely transformed in units of data units smaller than coding units. Transformation units 1714, 1716, 1722, 1732, 1748, 1750, 1752, and 1754 are data units having different sizes or shapes when they are compared with prediction units corresponding thereto among the prediction units 1760 and partitions. That is, the video encoding apparatus 800 and the video decoding apparatus 900 according to an embodiment may perform intra-prediction/motion estimation/motion compensation, and transformation/inverse transformation even on the same coding units, based on different data units.

Thus, an optimum coding unit may be determined by recursively encoding coding units having a hierarchical structure in units of maximum coding units, thereby obtaining coding units having a recursive tree structure. Encoding information may include split information regarding a coding unit, information regarding a partition mode, information regarding a prediction mode, and information regarding a size of a transformation unit.

According to an embodiment, the output unit 830 of the video encoding apparatus 800 may output the encoding information regarding coding units having a tree structure, and the encoding information extraction unit 920 of the video decoding apparatus 900 may extract the encoding information regarding the coding units having the tree structure from a received bitstream.

Split information represents whether a current coding unit is split into coding units of a lower depth. If split information of a current depth 'd' is 0, a depth at which the current coding unit is no longer split into coding units of a lower depth is a depth. Thus information regarding a partition mode, a prediction mode, and a size of a transformation unit may be defined for the depth. If the current coding unit is further split according to the split information, encoding is independently performed on four split coding units of a lower depth.

The prediction mode may be one of an intra-mode, an inter-mode, and a skip mode. The intra-mode and the inter-mode may be defined for all partition modes, and the skip mode may be defined only for a 2N×2N partition mode.

The information regarding the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1. The asymmetrical partition modes having the sizes of nL×2N and nR×2N may be respectively obtained by splitting the width of the prediction unit in 1:3 and 3:1.

The size of the transformation unit may be set to be two types in the intra-mode and two types in the inter-mode. That is, if split information of the transformation unit is 0, the size of the transformation unit may be 2N×2N to be equal to the size of the current coding unit. If the split information of the transformation unit is 1, transformation units may be obtained by splitting the current coding unit. Also, a size of the transformation unit may be N×N when a partition mode of the current coding unit having the size of 2N×2N is a symmetrical partition mode, and may be N/2×N/2 when the partition mode of the current coding unit is an asymmetrical partition mode.

According to an embodiment, the encoding information regarding coding units having a tree structure may be assigned to at least one among a coding unit corresponding to a depth, a prediction unit, and a minimum unit. The coding unit corresponding to the depth may include at least one prediction unit and at least one minimum unit that contain the same encoding information.

Thus, whether adjacent data units are included in coding units corresponding to the same depth may be determined by comparing encoding information of the adjacent data units. Also, a coding unit corresponding to a depth may be determined using encoding information of a data unit. Thus, a distribution of depths in a maximum coding unit may be determined.

In this case, when the current coding unit is predicted based on neighboring data units, encoding information of data units in coding units corresponding to depths adjacent to the current coding unit may be directly referred to and used.

According to another embodiment, if the current coding unit is prediction-encoded based on adjacent coding units, then adjacent coding units may be referred to by detecting data units adjacent to the current coding unit from among coding units corresponding to depths, based on encoding information of adjacent coding units corresponding to depths.

FIG. 20 is a diagram illustrating a relationship between a coding unit, a prediction unit, and a transformation unit, according to encoding mode information of Table 1.

A maximum coding unit 2000 includes coding units 2002, 2004, 2006, 2012, 2014, 2016, and 2018 corresponding to depths. Among these coding units, the coding unit 2018 is a coding unit corresponding to a depth and split information thereof may be set to '0'. Partition mode information of the coding unit 2018 having a size of 2N×2N may be set to represent one of a 2N×2N partition mode 2022, a 2N×N partition mode 2024, an N×2N partition mode 2026, an N×N partition mode 2028, a 2N×nU partition mode 2032, a 2N×nD partition mode 2034, an nL×2N partition mode 2036, and an nR×2N partition mode 2038.

Transformation unit split information, i.e., a Tu size flag, is a type of transformation index. The size of a transformation unit corresponding to the transformation index may vary according to a prediction unit type or a partition mode of a coding unit.

For example, if partition mode information is set to represent one of the 2N×2N partition mode 2022, the 2N×N partition mode 2024, the N×2N partition mode 2026, and the N×N partition mode 2028 which are symmetrical partition modes, then a transformation unit 2042 having a size of 2N×2N may be set when the transformation unit split information is '0', and a transformation unit 2044 having a size of N×N may be set when the transformation unit split information is '1'.

If the partition mode information is set to represent one of the 2N×nU partition mode 2032, the 2N×nD partition mode 2034, the nL×2N partition mode 2036, and the nR×2N partition mode 2038 which are asymmetrical partition modes, then a transformation unit 2052 having a size of 2N×2N may be set when the transformation unit split information (TU size flag) is 0, and a transformation unit 2054 having a size of N/2×N/2 may be set when the transformation unit split information (TU size flag) is 1.

Although the transformation unit split information (TU size flag) described above with reference to FIG. 19 is a flag having a value of 0 or 1, the transformation unit split information according to an embodiment is not limited to a 1-bit flag and may be set to increase to 0, 1, 2, 3, . . . according to setting such that a transformation unit is hierarchically split. The transformation unit split information may be an embodiment of a transformation index.

In this case, according to an embodiment, the size of a transformation unit that has been actually used may be expressed by using the transformation unit split information together with a maximum size and a minimum size of the transformation unit. According to an embodiment, the video encoding apparatus 800 may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. According to an embodiment, the video decoding apparatus 900 may decode video by using the maximum transformation unit size information, the minimum transformation unit size information, and the maximum transformation unit split information.

For example, (a) when a size of a current coding unit is 64×64 and a maximum size of a transformation unit is 32×32, the size of the transformation unit may be set to 32×32 when (a-1) the transformation unit split information is '0', may be set to 16×16 when (a-2) the transformation unit split information is '1', and may be set to 8×8 when (a-3) the transformation unit split information is '2'.

As another example, (b) when a size of a current coding unit is 32×32 and a maximum size of a transformation unit is 32×32, the size of the transformation unit may be set to 32×32 when (b-1) the transformation unit split information is '0'. Here, the transformation unit split information cannot be set to a value other than 0, since the size of the transformation unit cannot be less than 32×32.

As another example, (c) when a size of a current coding unit is 64×64 and maximum transformation unit split information is '1', the transformation unit split information may be '0' or '1'. Here, the transformation unit split information cannot be set to a value other than 0 or 1. Thus, if it is defined that the maximum transformation unit split information is 'MaxTransformSizeIndex', a minimum transformation unit size is 'MinTransformSize', and a transformation unit size is 'RootTuSize' when the transformation unit split information is '0', then a minimum transformation unit size 'CurrMinTuSize', which may be determined in a current coding unit, may be defined by:

$$\text{CurrMinTuSize}=\max(\text{MinTransformSize},\text{RootTuSize}/(2^{\text{MaxTransformSizeIndex}})) \quad (1)$$

Compared to the minimum transformation unit size CurrMinTuSize that may be determined in the current coding unit, the transformation unit size RootTuSize when the transformation unit split information is '0' may represent a maximum transformation unit size that is selectable in the system. In Equation (1), "RootTuSize/(2^MaxTransformSizeIndex)" denotes a transformation unit size when the transformation unit size RootTuSize, when the transformation unit split information is '0', is split a number of times corresponding to the maximum transformation unit split information, and "MinTransformSize" denotes a minimum transformation size. Thus, a smaller value from among 'RootTuSize/(2^MaxTransformSizeIndex)' and 'MinTransformSize' may be the minimum transformation unit size CurrMinTuSize that may be determined in the current coding unit.

According to an embodiment, the maximum transformation unit size RootTuSize may vary according to a prediction mode.

For example, if a current prediction mode is an inter-mode, then 'RootTuSize' may be determined according to Equation (2) below. In Equation (2), "MaxTransformSize" denotes a maximum transformation unit size, and "PUSize" denotes a current prediction unit size.

$$RootTuSize=\min(MaxTransformSize,PUSize) \quad (2)$$

That is, if the current prediction mode is the inter-mode, the transformation unit size RootTuSize when the transformation unit split information is '0' may be a smaller value from among the maximum transformation unit size and the current prediction unit size.

If a prediction mode of a current partition unit is an intra-mode, 'RootTuSize' may be determined according to Equation (3) below. In Equation (3), "PartitionSize" denotes the size of the current partition unit.

$$RootTuSize=\min(MaxTransformSize,PartitionSize) \quad (3)$$

That is, if the current prediction mode is the intra-mode, the transformation unit size RootTuSize when the transformation unit split information is '0' may be a smaller value from among the maximum transformation unit size and the size of the current partition unit.

*311However, the current maximum transformation unit size RootTuSize that varies according to a prediction mode in a partition unit is just an example, and a factor that determines the current maximum transformation unit size is not limited to the prediction mode in the partition unit.

According to a video encoding method performed based on coding units having a tree structure described above with reference to FIGS. 8 to 20, image data in the spatial domain is encoded for each of the coding units having the tree structure. According to a video decoding method performed based on coding units having a tree structure, image data in the spatial domain is restored by decoding maximum coding units to restore a picture and video that is a picture sequence. The restored video may be reproduced by a reproducing apparatus, stored in a recording medium, or transmitted via a network.

The embodiments described above can be written as computer programs and can be implemented in general-use digital computers that execute the programs using a computer-readable recording medium. Examples of the computer-readable recording medium include magnetic storage unit media (e.g., ROM, floppy disks, hard disks, etc.) and optical recording media (e.g., CD-ROMs, DVDs, etc.).

For convenience of explanation, the video encoding method described above with reference to FIGS. 1A to 20 and/or a video encoding method will be referred to simply as a 'video encoding method according to an embodiment'. Also, the video decoding method described above with reference to FIGS. 1A to 20 and/or a video decoding method will be referred to simply as a 'video decoding method according to an embodiment'.

Also, the video encoding apparatus, and the video encoding apparatus including the video encoding apparatus 800 or the video encoding unit 1100 described above with reference to FIGS. 1A to 20 will be referred to simply as a 'video encoding apparatus according to an embodiment'. Also, the interlayer video decoding apparatus, and the video decoding apparatus including the video decoding apparatus 900 or the video decoding unit 1200 described above with reference to FIGS. 1A to 20 will be referred to simply as a 'video decoding apparatus according to an embodiment'.

A computer-readable recording medium storing a program, e.g., a disc 26000, according to an embodiment will now be described in detail.

FIG. 21 illustrates a physical structure of a disc 21000 that stores a program, according to an embodiment. The disc 21000 described as an example of a recording medium may be a hard drive, a compact disc-read only memory (CD-ROM) disc, a Blu-ray disc, or a digital versatile disc (DVD). The disc 21000 includes a plurality of concentric tracks Tr each being divided into a specific number of sectors Se in a circumferential direction of the disc 21000. In a specific region of the disc 21000, a program configured to perform a method of determining quantized parameters, a video encoding method, and a video decoding method as described above may be assigned and stored.

A computer system embodied using a storage medium that stores a program for executing a video encoding method and a video decoding method as described above will be described with reference to FIG. 22 below.

FIG. 22 illustrates a disc drive 26800 configured to record and read a program by using a disc 26000. A computer system 26700 may store a program, which performs at least one of a video encoding method and a video decoding method according to an embodiment, in the disc 26000 using the disc drive 26800. To run the program stored in the disc 26000 in the computer system 26700, the program may be read from the disc 26000 and transmitted to the computer system 26700 by using the disc drive 26800.

A program that performs at least one of a video encoding method and a video decoding method according to an embodiment may be stored not only in the disc 21000 illustrated in FIG. 21 or the disc 26000 illustrated in FIG. 22 but also in a memory card, a ROM cassette, or a solid-state drive (SSD).

A system to which the video encoding method and the video decoding method according to the previous embodiments are applied will be described below.

FIG. 23 illustrates an entire structure of a content supply system 11000 configured to provide a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 1110 via an internet service provider 11200, a communication network 11400, and the wireless base stations 11700, 11800, 11900, and 12000.

However, the content supply system 1100$o$ is not limited to that illustrated in FIG. 24, and devices may be selectively connected thereto. The plurality of independent devices may be directly connected to the communication network 11400, rather than via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), code division multiple access (CDMA), wideband-code division multiple access (W-CDMA), the Global System for Mobile Communications (GSM), and the Personal Handyphone System (PHS).

The video camera 12300 may be connected to a streaming server 11300 via the wireless base station 11900 and the communication network 11400. The streaming server 11300 may allow content received from a user via the video camera 12300 to be streaming-transmitted via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data received from the camera 12600 may be encoded by the camera 12600 or the computer 12100. Software configured to encode and decode video may be stored in a computer-readable recording medium, e.g., a CD-ROM disc, a floppy disc, a hard disc drive, an SSD, or a memory card, which is accessible by the computer 12100.

If video data is captured by a camera built in the mobile phone 12500, the video data may be received from the mobile phone 12500.

The video data may be encoded by a large-scale integrated circuit (LSI) system installed in the video camera 12300, the mobile phone 12500, or the camera 12600.

According to an embodiment, the content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may streaming-transmit the encoded content data to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

A video encoding apparatus and a video decoding apparatus according to an embodiment are applicable to encoding/decoding operations of the plurality of independent devices included in the content supply system 11000.

The mobile phone 12500 included in the content supply system 11000 according to an embodiment will now be described in greater detail with reference to FIGS. 24 and 25.

FIG. 24 illustrates an external structure of a mobile phone 12500 to which a video encoding method and a video decoding method according to an embodiment are applicable. The mobile phone 12500 may be a smart phone, the functions of which are not limited and a large part of the functions of which may be changed or expanded using application programs.

*335The mobile phone 12500 includes an internal antenna 12510 via which a radio-frequency (RF) signal may be exchanged with the wireless base station 12000 of FIG. 26, and includes a display screen 12520 configured to display images captured by a camera 12530 or images that are received via the antenna 12510 and decoded, e.g., a liquid crystal display (LCD) or an organic light-emitting diodes (OLED) screen. The smart phone 12510 includes an operation panel 12540 including a control button and a touch panel. If the display screen 12520 is a touch screen, the operation panel 12540 further includes a touch sensing panel of the display screen 12520. The smart phone 12510 includes a speaker 12580 for outputting voice and sound or another type sound output unit, and a microphone 12550 for inputting voice and sound or another type sound input unit. The smart phone 12510 further includes the camera 12530, such as a charge-coupled device (CCD) camera, to capture video and still images. The smart phone 12510 may further include a storage medium 12570 for storing encoded or decoded data, e.g., video or still images captured by the camera 12530, received via email, or obtained according to another method; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 25 illustrates an internal structure of the mobile phone 12500 according to an embodiment. To systemically control parts of the mobile phone 12500 including a display screen 12520 and an operation panel 12540, a power supply circuit 12700, an operation input controller 12640, an image encoding unit 12720, a camera interface 12630, an LCD controller 12620, an image decoding unit 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button to change from a 'power off' state to a 'power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a random access memory (RAM).

While the mobile phone 12500 transmits communication data to the outside, a digital signal is generated by the mobile phone 12500 under control of the central controller 12710. For example, a digital sound signal may be generated by the sound processor 12650, a digital image signal may be generated by the image encoding unit 12720, and text data of a message may be generated via the operation panel 12540 and the operation input controller 12640. When a digital signal is delivered to the modulation/demodulation unit 12660 under control of the central controller 12710, the modulation/demodulation unit 12660 modulates a frequency band of the digital signal and a communication circuit 12610 performs digital-analog conversion (DAC) and frequency conversion on the frequency band-modulated digital signal. A transmission signal output from the communication circuit 12610 may be transmitted to a voice communication base station or the wireless base station 12000 via an antenna 12510.

For example, when the mobile phone 12500 is in a call mode, a sound signal obtained via the microphone 12550 is transformed into a digital sound signal by the sound processor 12650 under control of the central controller 12710. The digital sound signal may be transformed into a transmission signal via the modulation/demodulation unit 12660 and the communication circuit 12610, and transmitted via the antenna 12510.

When a text message, e.g., email, is transmitted in a data communication mode, text data of the text message is input via the operation panel 12540 and is transmitted to the central controller 12710 via the operation input controller 12640. Under control of the central controller 12710, the text data is transformed into a transmission signal via the modulation/demodulation unit 12660 and the communication circuit 12610 and is then transmitted to the wireless base station 12000 via the antenna 12510.

To transmit image data in the data communication mode, image data captured by the camera 12530 is provided to the image encoding unit 12720 via the camera interface 12630. The captured image data may be directly displayed on the display screen 12520 via the camera interface 12630 and the LCD controller 12620.

A structure of the image encoding unit 12720 may correspond to that of a video encoding apparatus as described above. The image encoding unit 12720 may transform image data received from the camera 12530 into compression-encoded image data by encoding the image data according to a video encoding method as described above or the image encoder 400 described above, and then output the compression-encoded image data to the multiplexer/demultiplexer 12680. During a recording operation of the camera 12530, a sound signal obtained via the microphone 12550 of the mobile phone 12500 may be transformed into digital sound data via the sound processor 12650. The digital sound data may be transmitted to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-digital conversion (ADC) are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510 and performs frequency transformation and ADC on the amplified signal to generate a digital sound signal. A received digital sound signal is transformed into an analog sound signal via the modulation/demodulation unit 12660 and the sound processor 12650, and the analog sound signal is output via the speaker 12580, under control of the central controller 1271.

When in the data communication mode, data of a video file accessed on an Internet website is received, a signal received from the wireless base station 12000 via the antenna 12510 is output as multiplexed data via the modulation/demodulation unit 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. The encoded video data stream is provided to the video decoding unit 12690 and the encoded audio data stream is provided to the sound processor 12650 via the synchronization bus 1273.

A structure of the image decoding unit 12690 may correspond to that of a video decoding apparatus as described above. The image decoding unit 12690 may decode the encoded video data to obtain restored video data and provide the restored video data to the display screen 12520 via the LCD controller 12620, according to a video decoding method as described above.

Thus, the video data of the video file accessed on the Internet website may be displayed on the display screen 12520. At the same time, the sound processor 12650 may transform audio data into an analog sound signal, and provide the analog sound signal to the speaker 12580. Thus, audio data contained in the video file accessed on the Internet website may also be reproduced via the speaker 12580.

The mobile phone 12500 or another type of communication terminal may be a transceiving terminal including both a video encoding apparatus and a video decoding apparatus according to an embodiment, may be a transceiving terminal including only the video encoding apparatus, or may be a transceiving terminal including only the video decoding apparatus.

A communication system according to an embodiment is not limited to that described above with reference to FIG. 24. For example, FIG. 26 illustrates a digital broadcasting system employing a communication system according to an embodiment. The digital broadcasting system of FIG. 26 may receive a digital broadcast transmitted via a satellite or a terrestrial network by using a video encoding apparatus and a video decoding apparatus according to an embodiment.

Specifically, a broadcasting station 12890 transmits a video data stream to a communication satellite or a broadcasting satellite 12900 by using electronic waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to an embodiment is included in a reproducing apparatus 12830, the reproducing apparatus 12830 may read and decode an encoded video stream recorded on a storage medium 12820, such as a disc or a memory card. A video signal restored by decoding the encoded video stream may be reproduced, for example, on a monitor 12840.

A video decoding apparatus according to an embodiment may be also installed in the household antenna 12860 for a satellite/terrestrial broadcast or the set-top box 12870 connected to a cable antenna 12850 for receiving cable television (TV) programs. Data output from the set-top box 12870 may also be reproduced on a TV monitor 12880.

As another example, a video decoding apparatus according to an embodiment may be installed in the TV receiver 12810 instead of the set-top box 12870.

An automobile 12920 including an appropriate antenna 12910 may receive a signal transmitted from the satellite 12800 or the wireless base station 11700 of FIG. 23. A decoded video may be reproduced on a display screen of an automobile navigation system 12930 installed in the automobile 12920.

A video signal may be encoded by a video encoding apparatus according to an embodiment and stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to an embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoding unit 12720 of FIG. 26. For example, the computer 12100 and the TV receiver 12810 may not include the camera 12530, the camera interface 12630, and the image encoding unit 12720 of FIG. 26.

FIG. 27 illustrates a network structure of a cloud computing system using a video encoding apparatus and a video decoding apparatus according to an embodiment.

The cloud computing system may include a cloud computing server 14000, a user database (DB) 14100, a plurality of computing resources 1420, and a user terminal.

The cloud computing system provides an on-demand outsourcing service of the plurality of computing resources 14200 via an information communication network, e.g., the Internet, in response to a request from the user terminal. In a cloud computing environment, a service provider provides users with desired services by combining computing resources at data centers located at physically different locations by using virtualization technology. A service user does not have to install computing resources, e.g., an application, a storage facility, an operating system (OS), or security features, into his/her own terminal in order to use them, but may select and use desired services from among services in a virtual space generated through the virtualization technology, at a desired point of time.

A user terminal of a specific service user accesses the cloud computing server 14000 via an information communication network including the Internet and a mobile telecommunication network. User terminals may be provided with cloud computing services, and particularly, motion picture reproduction services from the cloud computing server 14000. The user terminals may be various types of electronic devices capable of accessing the Internet, e.g., a desk-top PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining the plurality of computing resources 14200. The plurality of computing resources 14200 may include various data services, and data uploaded from user terminals. As described above, the cloud computing server 14000 may provide user terminals with desired services by combining motion picture databases distributed in different regions according to the virtualization technology.

User information regarding users who have subscribed to a cloud computing service is stored in the user DB 14100. The user information may include logging information, addresses, names, personal credit information, etc. of the users. The user information may further include indexes of motion pictures. Here, the indexes may include a list of motion pictures that have already been reproduced, a list of motion pictures that are being reproduced, a pausing point of a motion picture that was being reproduced, and the like.

Information regarding a motion picture stored in the user DB 14100 may be shared between user devices. For example, when a motion picture service is provided to the notebook computer 14600 in response to a request from the notebook computer 1460, a reproduction history of the motion picture service is stored in the user DB 14100. When a request to reproduce this motion picture service is received from the smart phone 14500, the cloud computing server 14000 searches for and reproduces this motion picture service, based on the user DB 14100. When the smart phone 14500 receives a motion picture data stream from the cloud computing server 14000, a process of reproducing video by decoding the motion picture data stream is similar to an operation of the mobile phone 12500 described above with reference to FIG. 24.

The cloud computing server 14000 may refer to a reproduction history of a desired motion picture service, stored in the user DB 14100. For example, the cloud computing server 14000 receives, from a user terminal, a request to reproduce a motion picture stored in the user DB 14100. If this motion picture was being reproduced, then a method of streaming this motion picture, performed by the cloud computing server 14000, may vary according to the request from the user terminal, i.e., according to whether the motion picture will be reproduced, starting from a start thereof or a pausing point thereof. For example, if the user terminal requests to reproduce the motion picture, starting from the start thereof, the cloud computing server 14000 streaming-transmits the motion picture starting from a first frame thereof to the user terminal. If the user terminal requests to reproduce the motion picture, starting from the pausing point thereof, the cloud computing server 14000 streaming-transmits the motion picture starting from a frame corresponding to the pausing point to the user terminal.

In this case, the user terminal may include a video decoding apparatus as described above with reference to FIGS. 1A to 20. As another example, the user terminal may include a video encoding apparatus as described above with reference to FIGS. 1A to 20. Alternatively, the user terminal may include both the video decoding apparatus and the video encoding apparatus as described above with reference to FIGS. 1A to 20.

Various embodiments to which the video encoding method, the video decoding method, the video encoding apparatus, and the video decoding apparatus described above with reference to FIGS. 1A to 20 are applied have been described above with reference to FIGS. 21 to 30. However, various embodiments in which the video encoding method and the video decoding method described above with reference to FIGS. 1A to 20 are stored in a storage medium or the video encoding apparatus and the video decoding apparatus described above with reference to FIGS. 1A to 20 are included in devices are not limited to the embodiments described above with reference to FIGS. 21 to 27.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

The invention claimed is:

1. A video decoding method comprising:
obtaining a motion vector of a current block belonging to a first picture from a bitstream, performed by a first decoding unit;
determining whether a reference block indicated by the motion vector is decoded, performed by the first decoding unit; and
when the reference block is not decoded, modifying the motion vector, performed by the first decoding unit; and
decoding the current block by using the modified motion vector, performed by the first decoding unit,
wherein the reference block is included in a second picture decoded by a second decoding unit, and
the first picture and the second picture are decoded in parallel.

2. The video decoding method of claim 1, wherein the modifying of the motion vector comprises modifying the motion vector to indicate one of decoded blocks of the second picture.

3. The video decoding method of claim 1, wherein the modifying of the motion vector comprises modifying a vertical component value of the motion vector to indicate a location on a decoded region of the second picture.

4. The video decoding method of claim 1, wherein the modifying of the motion vector comprises modifying a reference picture value of the motion vector to indicate another decoded picture.

5. The video decoding method of claim 1, wherein the modifying of the motion vector comprises:
determining at least one neighboring block belonging to the first picture and located near the current block; and
modifying the motion vector according to one of motion vectors of the at least one neighboring block.

6. The video decoding method of claim 1, wherein the modifying the motion vector comprises:
when the reference block is not decoded, stopping the decoding of the current block;
when the reference block is decoded within a preset time, decoding the current block by using the reference block; and
decoding the current block by using the modified motion vector, performed by the first decoding unit.

7. A video decoding apparatus for performing parallel-decoding, the video decoding apparatus comprising: a first decoding unit configured to obtain a motion vector of a current block belonging to a first picture from a bitstream, determine whether a reference block indicated by the motion vector is decoded, modifying the motion vector when the reference block is not decoded, and decode the current block based on whether the reference block is decoded by using the modified motion vector; and a second decoding unit configured to decode a second picture including the reference block, and the first picture and the second picture are decoded in parallel.

8. A non-transitory computer-readable recording medium having recorded a computer program for performing the method of claim 1.

* * * * *